(12) United States Patent  
Yamazaki et al.

(10) Patent No.: US 11,790,814 B2  
(45) Date of Patent: Oct. 17, 2023

(54) CONTROL OF MULTILAYER SURFACE FOR ENCLOSED SPACE

(71) Applicant: SONY GROUP CORPORATION

(72) Inventors: Ted Yamazaki, San Diego, CA (US); Tonni Larsen, San Diego, CA (US); Leigh Anderson, Novi, MI (US); Tatsushi Nashida, Kanagawa (JP); Naomasa Takahashi, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 257 days.

(21) Appl. No.: 17/220,668

(22) Filed: Apr. 1, 2021

(65) Prior Publication Data

US 2022/0165188 A1    May 26, 2022

Related U.S. Application Data

(60) Provisional application No. 63/116,983, filed on Nov. 23, 2020.

(51) Int. Cl.
*G09G 3/00* (2006.01)
*G02B 27/01* (2006.01)
(Continued)

(52) U.S. Cl.
CPC .......... *G09G 3/001* (2013.01); *B60K 35/00* (2013.01); *G02B 27/0101* (2013.01);
(Continued)

(58) Field of Classification Search
CPC .......... G09G 3/001; G09G 2320/066; G09G 2354/00; G09G 2360/144; G09G 2380/10;
(Continued)

(56) References Cited

U.S. PATENT DOCUMENTS 6,864,473 B2 * 3/2005 Chretien ............... H04N 23/75  
349/13  
7,413,330 B2   8/2008 Furukawa  
(Continued)

FOREIGN PATENT DOCUMENTS

JP     2020-087050 A    6/2020  
WO    2020/121779 A1   6/2020

OTHER PUBLICATIONS https://www.youtube.com/watch?v=ZgUQxy-vdZI.  
https://www.youtube.com/watch?v=UAxhMflrQs8&feature=youtu.be.

*Primary Examiner* — Grace Q Li  
(74) *Attorney, Agent, or Firm* — CHIP LAW GROUP

(57) ABSTRACT

A system includes a first multilayer surface that includes a plurality of layers. The system further includes a plurality of sensors and circuitry. The circuitry receives a plurality of signals from the plurality of sensors and projection data associated with a media content projectable by a projection device. The projection data includes contrast control information associated with the media content. The circuitry determines ambient condition of an enclosed space based on the received plurality of signals. The circuitry selects one or more portions of the plurality of layers of the first multilayer surface based on the determined ambient condition or the projection data. The circuitry controls an opacity level of the selected one or more portions of the first multilayer surface to provide dynamic shade control in the enclosed space or improve contrast of the projected media content based on the determined ambient condition or the projection data.

18 Claims, 10 Drawing Sheets

(51) Int. Cl.
*G09G 3/36* (2006.01)
*G02F 1/17* (2019.01)
*G02F 1/133* (2006.01)
*B60K 35/00* (2006.01)

(52) U.S. Cl.
CPC .......... *G02F 1/13318* (2013.01); *G02F 1/172* (2013.01); *G09G 3/36* (2013.01); *B60K 2370/1529* (2019.05); *B60K 2370/166* (2019.05); *B60K 2370/167* (2019.05); *B60K 2370/66* (2019.05); *G02B 2027/0118* (2013.01); *G09G 2320/066* (2013.01); *G09G 2354/00* (2013.01); *G09G 2360/144* (2013.01); *G09G 2380/10* (2013.01)

(58) Field of Classification Search
CPC ............ B60K 35/00; B60K 2370/1529; B60K 2370/66
See application file for complete search history.

(56) References Cited

U.S. PATENT DOCUMENTS

| | | | |
|---|---|---|---|
| 8,104,945 B2 | 1/2012 | Kim et al. | |
| 10,319,272 B1* | 6/2019 | Carter | G06F 3/012 |
| 10,434,940 B1* | 10/2019 | Verduzco Ochoa | B60Q 3/51 |
| 11,215,827 B1* | 1/2022 | Zhang | G02B 27/0172 |
| 2010/0094501 A1* | 4/2010 | Kwok | B60J 3/04 |
| | | | 359/609 |
| 2016/0147126 A1* | 5/2016 | Cammenga | G02F 1/157 |
| | | | 359/275 |
| 2020/0043960 A1* | 2/2020 | Lin | H01L 27/1262 |
| 2020/0209623 A1 | 7/2020 | Kim | |

* cited by examiner

CONTROL OF MULTILAYER SURFACE FOR ENCLOSED SPACE

CROSS-REFERENCE TO RELATED APPLICATIONS/INCORPORATION BY REFERENCE

This application claims priority to U.S. Provisional Patent Application Ser. No. 63/116,983 filed on Nov. 23, 2020, the entire content of which is hereby incorporated herein by reference.

FIELD

Various embodiments of the disclosure relate to a multilayer surface for an enclosed space. More specifically, various embodiments of the disclosure relate to a system, an apparatus, and a method for control of a multilayer surface for an enclosed space.

BACKGROUND

Recent advancements in the field of automobiles have led to development of vehicles with advanced features related to in-vehicle infotainment and driving assistance. For example, some of the features employed in a vehicle may include in-vehicle display screens mounted on a seat headrest of the vehicle and heads-up displays integrated with a windshield of the vehicle. However, existing in-vehicle display screens have a limited viewing angle and produce glare to an occupant (such as a driver or a passenger) of the vehicle in bright sunlight conditions, and thereby affects viewing experience. Moreover, bright sunlight conditions increase an ambient brightness inside the cabin of the vehicle, which deteriorates the visibility of the display screen (such as reduced contrast). Further, due to the space restrictions in the vehicle cabin, the existing in-vehicle display screens are small in size, and may not provide an optimum viewing experience to the occupant (such as the driver or the passenger) of the vehicle. Further, visibility of existing head-up displays is also reduced due to bright sunlight incident on the windshield, and may hamper usability of the head-up displays. Existing windshield accessories (such as sun visor) may merely block direct sunlight, but do not effectively resolve glare issue that may cause discomfort to or even hamper the visibility of the occupant (such as the driver or the passenger) of the vehicle. Thus, there is a need for a system that provides an improved in-vehicle viewing experience, maintains constant ambient conditions inside the vehicle, and effectively reduces glare caused to the occupant of the vehicle to assist in driving.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system, apparatus and method for control of a multilayer surface for an enclosed space is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
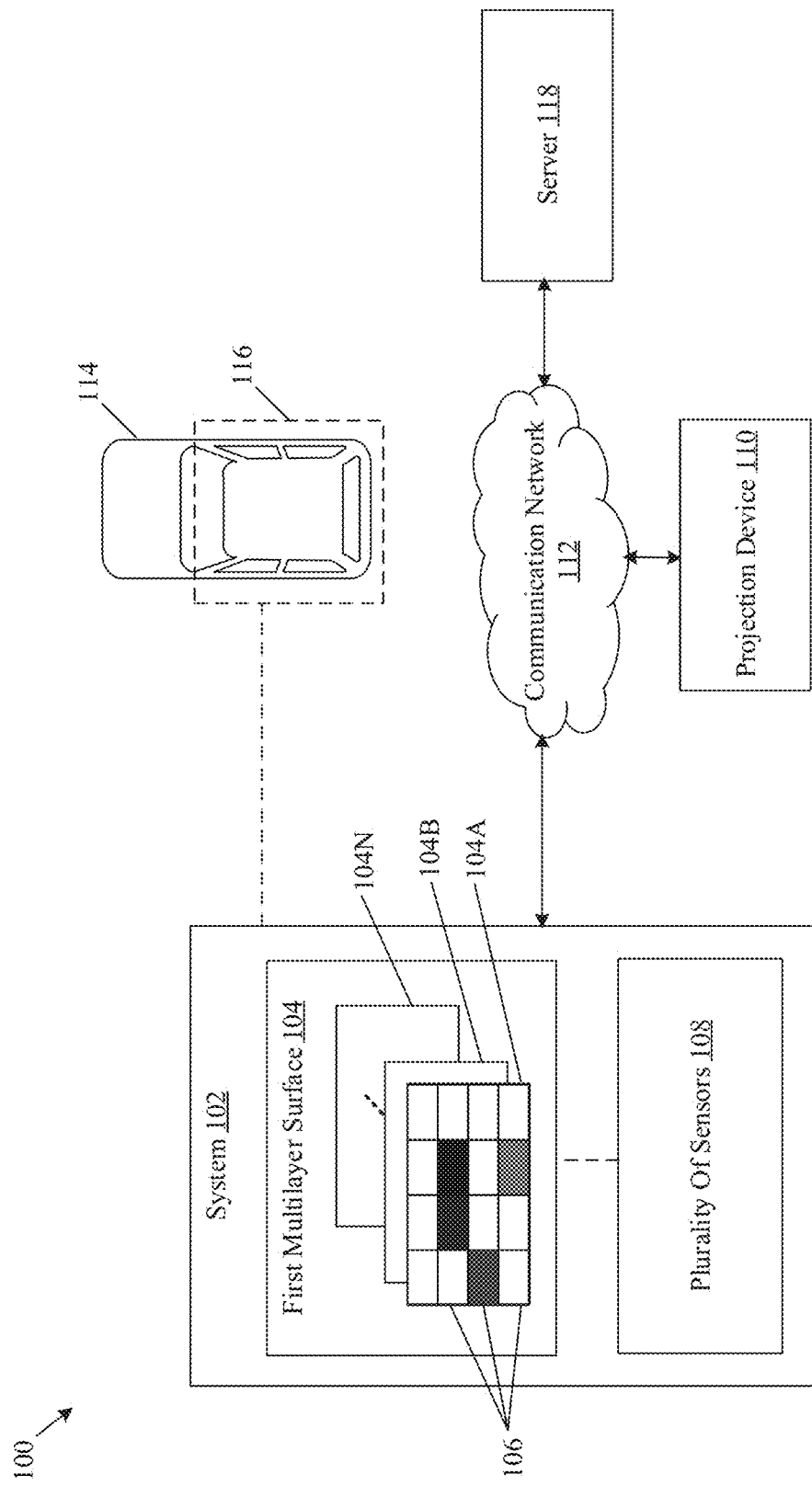
FIG. 1 is a block diagram that illustrates an exemplary network environment for control of a multilayer surface for an enclosed space, in accordance with an embodiment of the disclosure.

The following described implementations may be found in the disclosed system, apparatus, and method for control of a multilayer surface for an enclosed space. Exemplary aspects of the disclosure provide a system which may be implemented in the enclosed space (such as a cabin of a vehicle). The system may receive a plurality of signals (such as signals associated with ambient brightness in the vehicle, a position of an occupant in the vehicle, a position of an external light source with respect to a position of the occupant, or weather information) from the plurality of sensors. The system may further receive projection data associated with a media content (for example, an image or a movie) projectable by a projection device. For example, the media content may be projected in the enclosed space based on user input by the occupant of the vehicle. The projection data may include contrast control information associated with the media content. The system may further determine at least one ambient condition of the enclosed space based on the received plurality of signals. For example, the ambient condition may be an ambient light condition or an ambient brightness of the enclosed space. In some embodiments, the ambient light condition may correspond to a position and an amount of glare caused by the external light source (such as the sun or a headlamp of another vehicle) with respect to the occupant. Furthermore, the system may select one or more portions of at least one layer of a plurality of layers of a first multilayer surface based on at least one of the determined ambient condition or the projection data. For example, the first multilayer surface may correspond to a partition glass between a front section and a rear section of the enclosed space, a front glass of the enclosed space, a rear glass of the enclosed space, a roof window of the enclosed space, or a side window of the enclosed space. The system may further control an opacity level of the selected one or more portions of at least one layer of the first multilayer surface, based on at least one of the determined ambient condition or the projection data.

In accordance with an embodiment, the first multilayer surface may correspond to the front glass of the enclosed space (such as a windshield of the vehicle) on which the external light source may be incident. In such a case, the system may track a position of the external light source with respect to a position of the occupant (such as the driver or the passenger) of the enclosed space. The system may further determine, based on the plurality of signals, a position and an amount of glare caused by the external light source with respect to the occupant. The system may further control the opacity level of one or more portions of at least one layer of the plurality of layers of the first multilayer surface corresponding to the front glass, to reduce the amount of glare with respect to the occupant. Thus, the system may dynamically control the opacity level of the first multilayer surface based on the position of the glare with respect to the occupant, and thereby improve visibility of the occupant through the windshield of the vehicle.

In another embodiment, the first multilayer surface may correspond to the partition glass between the front section and the rear section of the enclosed space. The system may receive the user input corresponding to the projection of the media content by the occupant (such as the driver or the passenger of the vehicle), and selection of the first multilayer surface as a projection surface for projection of the media content. The system may project the media content on the first multilayer surface corresponding to the partition glass, thereby eliminating a need of installation of additional hardware (such as seat headrest display screen) in the enclosed space. The system may further provide an improved viewing experience of the occupant of the enclosed space by projection of the media content on a portion of the partition glass or an entirety of the partition glass. The system may further improve a contrast of the projected media content by synchronization of the selection of the one or more portions the first multilayer surface and the control of the opacity level of the selected one or more portions with a playback of the media content projected on the projection surface.

In another embodiment, the system may further control the opacity of portions of the first multilayer surface that may correspond to the roof window or the side window of the enclosed space, to provide dynamic shade control from the external light source and to maintain constant brightness inside the enclosed space. Thus, the system prevents deterioration of the visibility of the media content due to bright sunlight conditions. Therefore, the system may provide an improved in-vehicle viewing experience, maintain constant ambient conditions inside the vehicle, and effectively reduce glare caused to the occupant of the vehicle to assist in driving. The system may further control one or all multilayer surfaces of the enclosed space (such as the cabin of the vehicle) to become fully transparent by a single command, such as, a voice command, a gesture command, or a touch input command (for example, for emergency purpose or refresh purpose).

FIG. 1 is a block diagram that illustrates an exemplary network environment for control of a multilayer surface for an enclosed space, in accordance with an embodiment of the disclosure. With reference to FIG. 1, there is shown a network environment 100. In the network environment 100, there is shown a system 102. The system 102 may include a first multilayer surface 104. In an embodiment, the first multilayer surface 104 may include a plurality of layers. The plurality of layers of the first multilayer surface 104 may include a first layer 104A, a second layer 104B, and an Nth layer 104N. Each of the plurality of layers may include one or more portions. For example, the first layer 104A may include one or more portions 106. The system 102 may further include a plurality of sensors 108. In the network environment 100, there is further shown a projection device 110 and a communication network 112. In the network environment 100, there is further shown a vehicle 114 and an enclosed space 116 associated with the vehicle 114. In an embodiment, the system 102 and the projection device 110 may be integrated with the vehicle 114. The system 102 and the projection device 110 may communicate with each other via the communication network 112.

The system 102 may include suitable logic, circuitry, interfaces, and/or code that may be configured to receive a plurality of signals from the plurality of sensors 108 and projection data associated with a media content projectable by the projection device 110. The system 102 may further determine an ambient condition of the enclosed space 116 associated with the plurality of signals. Furthermore, the system 102 may select the one or more portions 106 of at least the first layer 104A of the first multilayer surface 104 and control an opacity level of the one or more portions 106 of the first layer 104A of the first multilayer surface 104. The system 102 may be a specialized electronic circuitry that may be a part of an electronic control unit (ECU) processor to control different functions, such as, but not limited to, ambience control operations, engine operations, communication operations, and data acquisition operations (such as acquisition of the plurality of signals) of the vehicle 114. The system 102 may be, for example, a microprocessor. Other examples of the system 102 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable consumer electronic (CE) device, a server, and other computing devices. The system 102 may be integrated with the vehicle 114, as depicted in FIG. 1. In another embodiment, the system 102 may be separate from the vehicle 114.

The first multilayer surface 104 may be an electronically or electrically modulated optical glass, and may include a plurality of layers. The opacity level of the first multilayer surface 104 may be controlled by application of a signal (for example, current or voltage) to each layer of the first multilayer surface 104. The color of the first multilayer surface 104 may be changed, based on individual control of the opacity level of each layer of the plurality of layers. The opacity level of the plurality of layers may be controlled by the application of the voltage to one or more of the first layer 104A, the second layer 104B, or the Nth layer 104N of the plurality of layers. In some embodiments, the first multilayer surface 104 may be opaque, in case no voltage is applied to the first multilayer surface 104. The first multilayer surface 104 may become transparent, based on the application of the voltage to one or more layers of the plurality of layers. In one or more embodiments, the first multilayer surface 104 may be semi-transparent based on the application of the voltage to at least one layer of the plurality of layers of the first multilayer surface 104. Further, each layer of the plurality of layers 104A-104N may be divided into multiple portions 106. The system may individually control the opacity level of each portion of the multiple portions 106 of the first layer 104A and remaining layers of the plurality of layers, based on the application of the voltage. In accordance with an embodiment, the first multilayer surface 104 may be employed in the enclosed space, such as the enclosed space 116 of the vehicle 114, an enclosed space of a room in a building, and so forth. In accordance with an embodiment, the first multilayer surface 104 may be employed in wearable glasses, helmet visors, display screens, mirrors, and so forth. Examples of each layer of the first multilayer surface 104 may include, but are not limited to, a liquid crystal (LC) layer, a suspended particle device (SPD) layer, a micro-blind display layer, a polymer-dispersed liquid crystal devices (PDLCs) layer, an electrochromic layer, a smart glass, or a combination thereof.

In an example, the first layer 104A of the first multilayer surface 104 may include an LC layer, and the second layer 1048 of the first multilayer surface 104 may include an SPD layer, or vice versa. The LC layer comprises a structure in which liquid crystals are suspended in a medium (such as a polymer) between two layers of transparent conductive material that serve as electrodes. In case no voltage is applied to the electrodes, the liquid crystals are randomly arranged, and the light incident on the LC layer is scattered by the liquid crystals as the light to passes through the LC layer. This causes the LC layer to have a whitish translucent appearance. In case a voltage is applied to the electrodes, the electric field causes the liquid crystals to align, and allows the light to pass through the LC layer with little scattering. This causes the LC layer to appear transparent. The SPD layer comprises, for example, nano-scale particles suspended in a liquid and placed between two layer of transparent material. In case no voltage is applied, the suspended particles are randomly organized, and thus blocks and absorbs light. This causes the SPD layer to appear dark. In case a voltage is applied, the suspended particles align and allow the light to pass through the SPD layer. The orientation of the suspended particles may be varied with an amount of the voltage applied, which controls an amount of glazing and an amount of light transmitted through the SPD layer.

The N number of plurality of layers of the first multilayer surface 104, shown in FIG. 1 is presented merely as an example. The plurality of layers of the first multilayer surface 104 may include one layer only or more than N number of layers, without deviation from the scope of the disclosure. For the sake of brevity, N number of layers of the plurality of layers have been shown in FIG. 1. However, in some embodiments, there may be more than N number of layers, without limiting the scope of the disclosure.

The plurality of sensors 108 may include suitable logic, circuitry, and interfaces that may be configured to generate the plurality of signals. The plurality of sensors 108 may be configured to determine a position of an occupant in the vehicle 114, track a position of an external light source with respect to the position of the occupant in the vehicle 114, measure a brightness level inside the enclosed space 116, number and positions of occupants in the vehicle 114, etc. In an example, the plurality of sensors 108 may generate the plurality of signals based on the determined position of the occupant and the position of the external light source. The plurality of sensors 108 may be positioned at different positions (such as, front, rear, inside, and outside) of the vehicle 114. Examples of the plurality of sensors 108 may include, but are not limited to, an image sensor (such as a smart camera with event detection), a light detection and ranging (LiDAR) sensor, an audio sensor, a location sensor (such as global positioning system sensor), an IR sensor, an ambient light sensor (such as a photodetector, a photodiode, or a photoresistor), an audio sensor (such as a microphone), or a pressure sensor.

The projection device 110 may include suitable logic, circuitry, and interfaces that may be configured to project the media content, such as an image or a series of images (for example a movie) on a projection surface (such as a projection screen). In some embodiments, the first multilayer surface 104 may be utilized as the projection surface and the projection device 110 may project the media content on the first multilayer surface 104. In an embodiment, the projection device 110 may be a part of an in-vehicle infotainment system of the vehicle 114. In an embodiment, the projection device 110 may be a portable projector carried by the occupant of the vehicle 114. Examples of the projection device 110 may include, but are not limited to, cathode ray tube (CRT) projection device, an LCD projection device, a liquid crystal on silicon (LCOS) projection device, a digital light processing (DLP) projection device, and a short-throw projection system.

The communication network 112 may include a communication medium through which the system 102 and the projection device 110 may communicate with each other. In some embodiments, the system 102 may also communicate with a user device (shown in FIG. 3) associated with the occupant of the vehicle 114 and the server 118 via the communication network 112. The communication network 112 may be one of a wired connection or a wireless connection. Examples of the communication network 112 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), a Metropolitan Area Network (MAN), or a satellite communication network (such as a satellite constellation). Various devices in the network environment 100 may be configured to connect to the communication network 112 in accordance with various wired and wireless communication protocols. Examples of such wired and wireless communication protocols may include, but are not limited to, at least one of a point-to-point communication, Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth® (BT) communication protocols The vehicle 114 may be a non-autonomous vehicle, a semi-autonomous vehicle, or a fully autonomous vehicle, for example, as defined by National Highway Traffic Safety Administration (NHTSA). The system 102 may be integrated within the vehicle 114. In an embodiment, the first multilayer surface 104 may correspond to one of a partition glass between a front section and a rear section of the enclosed space 116 (such as a cabin) of the vehicle 114, a front glass (such as a windshield) of the enclosed space 116, a rear glass of the enclosed space 116, a roof window of the enclosed space 116, or a side window of the enclosed space 116 of the vehicle 114. Examples of the vehicle 114 may include, but are not limited to, a two-wheeler vehicle, a three-wheeler vehicle, a four-wheeler vehicle, a hybrid vehicle, an aerial vehicle (e.g. a passenger drone), a watercraft, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The vehicle 114 may be a system through which the occupant (such as the driver or the passenger) may travel from a start point to a destination point. Examples of the two-wheeler vehicle may include, but are not limited to, an electric two-wheeler, an internal combustion engine (ICE)-based two-wheeler, or a hybrid two-wheeler. Examples of the four-wheeler vehicle may include, but are not limited to, an electric car, an internal combustion engine (ICE)-based car, a fuel-cell based car, a solar powered-car, or a hybrid car. It may be noted the present disclosure may be also applicable to other types of vehicles. The description of other types of the vehicle has been omitted from the disclosure for the sake of brevity.

The server 118 may include suitable logic, circuitry, and interfaces that may be configured to store, for example, media content and weather information. In some embodiments, the server 118 may be configured to store user-generated media content, third party content (such as movies, television series, etc.), and metadata (such as contrast control information) related to the media content. In some embodiments, the server 118 may be associated with an online streaming service. The server 118 may further store predicted weather information by geography and date and time. In certain instances, the server 118 may be implemented as a cloud server which may execute operations through web applications, cloud applications, HTTP requests, repository operations, file transfer, and the like. Other example implementations of the server 118 may include, but are not limited to, a database server, a file server, a web server, a media server, an application server, a mainframe server, or other types of servers. In certain embodiments, the server 118 may be implemented as a plurality of distributed cloud-based resources by use of several technologies that are well known to those skilled in the art. A person of ordinary skill in the art will understand that the scope of the disclosure may not be limited to implementation of the server 118 and the system 102 as separate entities. Therefore, in certain embodiments, functionalities of the server 118 may be incorporated in its entirety or at least partially in the system 102, without departing from the scope of the disclosure.

In operation, the system 102 may be configured to receive the plurality of signals from the plurality of sensors 108. The received plurality of signals may be associated with various factors, such as, weather condition at a geo-location of the vehicle 114, a position of the occupant within the vehicle, the ambient lighting condition, and so on. In an embodiment, the plurality of signals may be based on the tracked position of the external light source (such as the sun) with respect to the position of the occupant of the vehicle 114. The system 102 may further receive a user input from the occupant (such as the driver or the passenger) of the vehicle 114, for projection of the media content. Based on the user input, the system 102 may be configured to receive the projection data associated with the media content projectable by the projection device 110. The projection data may include contrast control information associated with the media content. Details of the reception of the plurality of signals and the projection data are further described for example, in FIG. 4A.

Furthermore, the system 102 may determine at least one ambient condition of the enclosed space 116 of the vehicle 114, based on the received plurality of signals. In one or more embodiments, the ambient condition may correspond to an ambient light condition of the enclosed space 116. For example, glare from the external light source (such as the sun) may be incident on the eyes of the occupant (such as the driver or the passenger) of the vehicle 114, which may affect visibility of the occupant of the vehicle 114. In such a case, the system 102 may determine a position and an amount of the glare caused by the external light source with respect to the occupant (such as the driver or the passenger) as the ambient light condition. In another example, the system 102 may determine an ambient brightness of the enclosed space 116 as the ambient light condition. Details of the determination of the ambient condition are further described for example, in FIGS. 3, 4A, 4B, 4C, 6A and 6B.

The system 102 may further select the one or more portions 106 of at least one layer (such as the first layer 104A) of the plurality of layers of the first multilayer surface 104 based on one of the determined ambient condition or the projection data. For example, the system 102 may select the one or more portions 106 of at least the first layer 104A of the first multilayer surface 104 based on the determined position and the determined amount of the glare from the external light source (such as the sun). The first multilayer surface 104 may correspond to a front glass (such as a windshield) of the enclosed space 116 of the vehicle 114 on which the glare may be caused with respect to the position of the occupant of the vehicle 114.

In some embodiments, the occupant may be a passenger who may select the first multilayer surface 104 as a projection surface for the projection of the media content. The passenger may be in a rear section of the enclosed space 116 of the vehicle 114. In such a case, the first multilayer surface 104 may correspond to a partition glass between the front section and the rear section of the enclosed space 116 of the vehicle 114. The system 102 may select the one or more portions 106 of at least the first layer 104A of the first multilayer surface 104 to be utilized as a projection screen, based on the projection data and a position of the passenger on the rear seat of the vehicle 114. Details of the selection of the one or more portions 106 of the first multilayer surface 104 are further described for example, in FIG. 3.

The system 102 may further control an opacity level of the selected one or more portions 106 of the first multilayer surface 104, based on one of the determined ambient condition or the projection data. For example, the opacity level of the selected one or more portions 106 of the first multilayer surface 104 (such as the front glass) may be increased by 40%, based on the determined amount and position of glare incident on the face of the occupant. In another example, the opacity level of the selected one or more portions 106 of the first multilayer surface 104 (such as the partition glass utilized as the projection screen) may be increased by 90%, based on the projection data to control the contrast of the projected media content. Details of the control of the one or more portions 106 of the first multilayer surface 104 are further described for example, in FIG. 3. Further, exemplary embodiments of the control of the one or more portions 106 of the first multilayer surface 104, based on different scenarios are further described for example, in FIGS. 4A-4C, 5A, 5B, 6A, 6B, 7A, 7B, 8A, and 8B.

Thus, the system 102 of the present disclosure may provide dynamic shade control in the enclosed space (such as the cabin) of the vehicle 114, based on the control of the opacity level of the first multilayer surface 104, thereby providing a comfortable riding experience to the occupant. The system 102 may further allow the occupant (such as the driver or the passenger) to view the media content on a portion of or the entirety of the partition glass with a controlled cabin brightness of the enclosed space 116 and the controlled contrast of the media content, thereby providing an improved viewing experience to the occupant of the vehicle 114. The system 102 may further individually control the first multilayer surface 104 corresponding to each of the glasses (such as the rear glass, the roof window, the front glass, the side window) of the vehicle 114 for the projection of the media content, based on the position of the occupant or their preference, thereby providing an enhanced entertainment experience to the occupant of the vehicle 114. The system 102 may further control the opacity of the selected portions of the front glass, thereby improving usability of heads-up display on the front glass.

Figure 2:
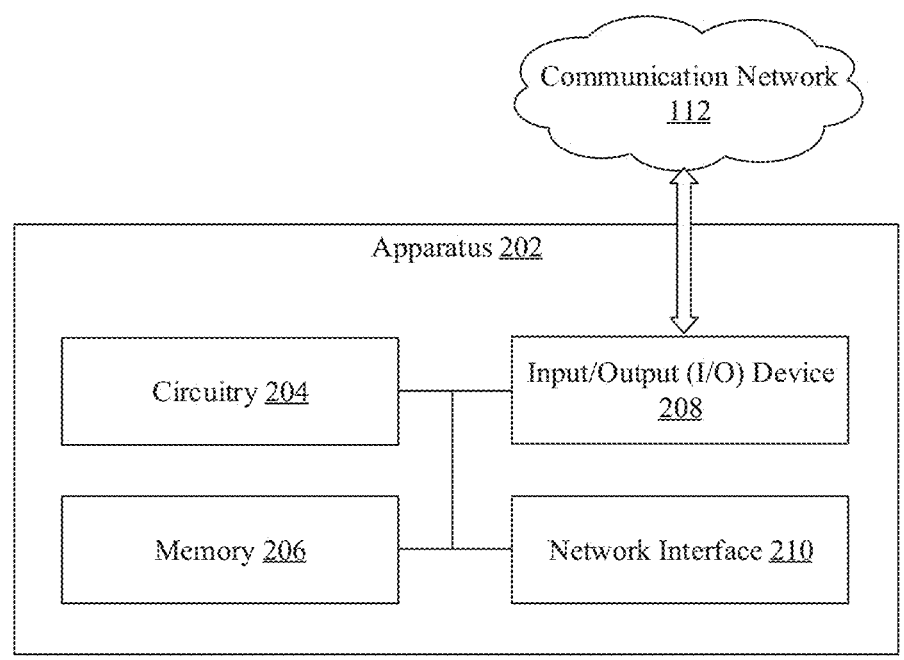
FIG. 2 is a block diagram that illustrates an exemplary apparatus for control of a multilayer surface for an enclosed space, in accordance with an embodiment of the disclosure.

FIG. 2 is a block diagram that illustrates an exemplary apparatus for control of a multilayer surface for an enclosed space, in accordance with an embodiment of the disclosure. FIG. 2 is explained in conjunction with elements from FIG. 1. With reference to FIG. 2, there is shown a block diagram 200 of an apparatus 202. In some embodiments, the apparatus 202 may be a part of the system 102 described in FIG. 1. The apparatus 202 may include circuitry 204, a memory 206, an Input/Output (I/O) device 208, and a network interface 210. The circuitry 204 may be communicatively coupled to the memory 206, the I/O device 208, and the network interface 210. With reference to FIG. 2, there is further shown the communication network 112.

The circuitry 204 may include suitable logic, circuitry, and interfaces that may be configured to execute program instructions associated with different operations to be executed by the apparatus 202. For example, some of the operations may include receiving the plurality of signals from the plurality of sensors 108 and projection data associated with the media content projectable by the projection device 110. The circuitry 204 may further determine the ambient condition of the enclosed space 116 based on the plurality of signals. Furthermore, the circuitry 204 may select the one or more portions 106 of at least the first layer 104A of the first multilayer surface 104 and control of the opacity level of the one or more portions 106 of the first layer 104A of the first multilayer surface 104. The circuitry 204 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 204 may be implemented based on a number of processor technologies known in the art.

Examples of implementations of the circuitry 204 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 206 may include suitable logic, circuitry, and interfaces that may be configured to store the one or more instructions to be executed by the circuitry 204. The memory 206 may be configured to store the media content and the projection data associated with the media content. The projection data may include contrast control information associated with the media content. Furthermore, the memory 206 may be configured to store the information related to a weather condition at a geo-location of the vehicle 114. Furthermore, the memory 206 may be configured to store the past information related to preference of each occupant (such as preferred cabin brightness level with respect to each occupant) of the vehicle 114. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive a user input from the occupant of the vehicle 114 and provide an output based on the received input. The user input may correspond to selection of the media content on the first multilayer surface 104, selection of the first multilayer surface 104 as the projection screen, brightness level of the cabin of the vehicle 114, and so forth. The output may correspond to the projection of the media content on the first multilayer surface 104 utilized as the projection screen. The user input may further correspond to control of parameters associated with the media content, such as volume control, color control, and brightness control. The I/O device 208, which may include various input and output devices, may be configured to communicate with the circuitry 204. Examples of the I/O device 208 may include, but are not limited to, a touch screen, a keyboard, a mouse, a joystick, a microphone, a display device, and a speaker.

The network interface 210 may include suitable logic, circuitry, and interfaces that may be configured to facilitate communication between the apparatus 202, the server 118, and the projection device 110. The apparatus 202 may receive media content, metadata (such as contrast control information) related to the media content, and weather information from the server 118 via the network interface 210. The network interface 210 may further facilitate communication between the circuitry 204, the first multilayer surface 104, the plurality of sensors 108, and the projection device 110. The network interface 210 may be further configured to facilitate communication between the system 102 and a native ECU (not shown) of the vehicle 114 to receive various data related to the operation and condition of the vehicle 114 (such as activation of cabin lights in the vehicle 114). The network interface 210 may be implemented by use of various known technologies to support wired or wireless communication of the system 102 with the communication network 112. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, a radio-frequency identification (RFID) tag, a Bluetooth® transceiver, or a local buffer circuitry. The network interface 210 may be configured to communicate via wireless communication with networks, such as the Internet, an Intranet or a wireless network, such as a cellular telephone network, a wireless local area network (LAN), a metropolitan area network (MAN), and a satellite communication network (such as a satellite constellation). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the system 102, as described in FIG. 1, may be performed by the circuitry 204. Operations executed by the circuitry 204 are described in detail, for example, in FIGS. 3, 4A-4C, 5A, 5B, 6A, 6B, 7A, 7B, 8A, 8B, and 9.

Figure 3:
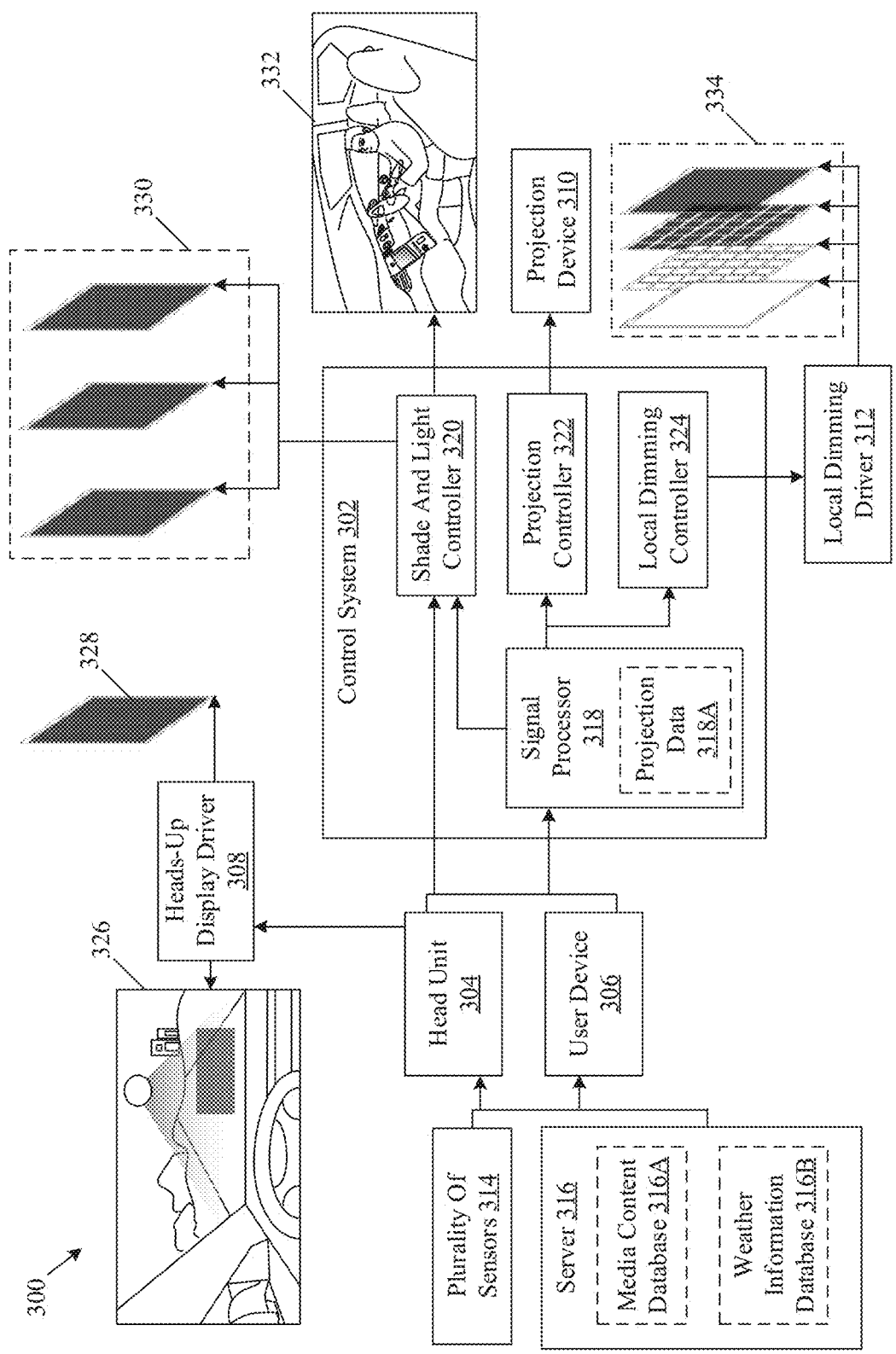
FIG. 3 is a block diagram that illustrates a system for control of a multilayer surface for an enclosed space, in accordance with an embodiment of the disclosure.

FIG. 3 is a block diagram that illustrates a system for control of a multilayer surface for an enclosed space, in accordance with an embodiment of the disclosure. FIG. 3 is described in conjunction with elements from FIGS. 1 and 2. With reference to FIG. 3, there is shown a block diagram 300. In the block diagram 300, there is shown a control system 302 and a server 316. In the block diagram 300, there is further shown a head unit 304, a user device 306, a heads-up display driver 308, a projection device 310, a local dimming driver 312, and a plurality of sensors 314. Furthermore, the control system 302 may include a signal processor 318, a shade and light controller 320, a local dimming controller 324, a heads-up display 326, a multilayer surface 328 that may correspond to the front glass of the enclosed space 116, a multilayer surface 330 that may correspond to each of the side windows or the roof window of the enclosed space 116, a multilayer surface 334 that may correspond to the partition glass of the enclosed space 116. The configuration and functions of the multilayer surface 328, the multilayer surface 330, and the multilayer surface 334 may be same as the configuration and functions of the first multilayer surface 104 described, for example, in FIG. 2. Therefore, the description of the multilayer surface 328, the multilayer surface 330, and the multilayer surface 334 is omitted from the disclosure for the sake of brevity.

The control unit 302 may include suitable logic, circuitry, and interfaces that may be configured to execute program instructions associated with for control of a multilayer surface (such as the multilayer surface 328, the multilayer surface 330, or the multilayer surface 334) for an enclosed space 2. The functions of the control system 302 may be same as the functions of the circuitry 204 described, for example, in FIG. 2. Therefore, the description of the control system 302 is omitted from the disclosure for the sake of brevity.

The head unit 304 may include suitable logic, circuitry, and interfaces that may be configured to control a set of operations related to the vehicle 114. Examples of the set of operations may include, but are not limited to, control of display of the media content on the windshield of the vehicle 114, display of navigation information and status (such as speed, fuel information) on the windshield of the vehicle 114, and so on. The head unit 304 may comprise an interface that may allow the occupant to provide a user input via gesture to change the display on the windshield of the vehicle 114.

The user device 306 may include suitable logic, circuitry, and interfaces that may be configured to receive the user input from the occupant (such as the driver or the passenger) of the vehicle 114. For example, the user input may be related to the selection of the media content for projection on the first multilayer surface 104, or selection of the first multilayer surface 104 as a projection surface, based on the preference of the occupant. Examples of the user device 306 may include, but are not limited to, a smartphone, a cellular phone, a mobile phone, a tablet computer, a computing device, a gaming device, a mainframe machine, a server, a computer work-station, and/or a consumer electronic (CE) device.

The heads-up display driver 308 may include suitable logic, circuitry, and interfaces that may be configured to receive control signals and feed from the head unit 304 to display information. The heads-up display driver 308 may provide drive signals from the head unit to the heads-up display 326, which may be integrated with the front glass (such as the windshield) of the vehicle 114. The heads-up display 326 may be in a field-of-view of the driver of the vehicle 114. In an exemplary scenario, the front glass of the vehicle 114 may include a multilayer surface 328 (such as the first multilayer surface 104). The heads-up display driver 308 may further control the opacity level of the multilayer surface 328 based on various factors (such as display of information on the heads-up display 326, amount and position of the glare caused by external light source, cabin brightness, and so on).

The projection device 310 may include suitable logic, circuitry, and interfaces that may be configured to project the media content, such as an image or a series of images (for example a movie) on a projection surface. The functions of the projection device 310 may be same as the functions of the projection device 110 described, for example, in FIG. 1. Therefore, the description of the projection device 310 is omitted from the disclosure for the sake of brevity.

The plurality of sensors 314 may include suitable logic, circuitry, and interfaces that may be configured to generate the plurality of signals. The configuration and functions of the plurality of sensors 314 may be same as the configuration and functions of the plurality of sensors 108 described, for example, in FIG. 1. Therefore, the description of the plurality of sensors 314 is omitted from the disclosure for the sake of brevity.

The server 316 may include suitable logic, circuitry, and interfaces that may be configured to store, for example, media content and weather information. In some embodiments, the server 316 may include a media content database 316A configured to store user-generated media content, third party content (such as movies, television series, etc.), and metadata (such as contrast control information) related to the media content. In some embodiments, the server 316 may be associated with an online streaming service. The server 316 may include a weather information database 3168 configured to store predicted weather information by geography (such as by different parts of a district) and by date and time of day (such as Sunday evening, Monday morning, etc.). The functions of the server 316 may be same as the functions of the server 118 described, for example, in FIG. 1. Therefore, the description of the server 118 is omitted from the disclosure for the sake of brevity.

The signal processor 318 may include suitable logic, circuitry, and interfaces that may be configured to measure, filter, and compress a plurality of signals received from the head unit 304 and the user device 306. For example, the signal processor 318 may process the plurality of signals associated with the ambient condition and the metadata (such as projection data 318A) associated with the media content. In an embodiment, the signal processor 318 may acquire the projection data 318A from the server 316 or the user device 306. In another embodiment, the signal processor 318 may process one or more frames of the media content received from the server 316 or the user device 306 to generate the projection data 318A. For example, the signal processor 318 may perform image segmentation and object detection on one or more frames of the media content, and may generate the projection data 318A based on the objects detected in the frames of the media content. In an example, the projection data 318A comprises contrast control information associated with the media content. The signal processor 318 may process the media content and the metadata associated with the media content received from the server 316 (for example, from the media content database 316A of the server 316) or the user device 306. The signal processor 318 may be implemented based on a number of processor technologies known in the art. Examples of the processor technologies may include, but are not limited to, a microprocessor chip, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The shade and light controller 320 may include suitable logic, circuitry, and interfaces that may be configured to control the opacity level of the one or more portions 106 of a multilayer surface 330. The shade and light controller 320 may individually control the opacity level of one or more portions of the multilayer surface 330 corresponding to each of the side window, the rood window, or the rear glass of the enclosed space 116. The opacity level of the one or more portions of each layers of the multilayer surface 330 may be controlled based on application of voltage to each of the one or more portions (such as the one or more portions 106). For example, a different amount of voltage may be applied to different portions of the multilayer surface 330 to obtain different levels of opacity, and thus obtain different levels of shade in the enclosed space 116. The shade and light controller 320 may further control cabin lights in the enclosed space 116 of the vehicle 114 based on the control of the ambient brightness by the control system 302.

In accordance with an embodiment, the multilayer surface 330 may be employed in the enclosed space 116 of the vehicle 114, as shown in a scenario 332. The multilayer surface 330 (such as same as the first multilayer surface 104) may correspond to each of the front glass of the enclosed space 116 and a side window of the enclosed space 116 of the vehicle 114, as shown in the scenario 332. The multilayer surface 330 may further correspond to each of the partition glass between the front section and the rear section of the enclosed space 116, a roof window of the enclosed space 116, and a rear glass of the enclosed space 116 of the vehicle 114.

The projection controller 322 may include suitable logic, circuitry, and interfaces that may be configured to receive the media content and the projection data 318A from the server 316 or the user device 306 via the signal processor 318. The projection controller 322 may further control the projection device 310 to project the media content on the first multilayer surface 104. The projection controller 322 may further control various parameters of the projection device (such as throw angle, power, color, brightness, contrast, and so on). In an exemplary scenario, the first multilayer surface 104 may be the partition glass of the vehicle 114, on which the projection device 310 may project the media content. The opacity level of the one or more portions of the partition glass may be controlled based on the application of voltage to each of the one or more portions.

The local dimming controller 324 may include suitable logic, circuitry, and interfaces that may be configured to generate control signals to control the opacity level of each layer of a multilayer surface 334 that corresponds to the projection surface, based on the projection data 318A and the media content received from the signal processor 318. The opacity level may be controlled based on the application of voltage to one or more portions of the multilayer surface 334. Such control of the dimness level of the multilayer surface 334 based on the projection data 318A and the media content may improve contrast level of the displayed media content on the projection surface (such as the multilayer surface 334).

The local dimming driver 312 may include suitable logic, circuitry, and interfaces that may be configured to control the amount of voltage applied to the one or more portions of each layer of the multilayer surface 334 based on the control signals received from the local dimming controller 324. The control of the amount of voltage on the one or more portions of the multilayer surface 334 may enable effective control of the opacity level of the multilayer surface 334.

The heads-up display 326 may include suitable logic, circuitry, and interfaces that may be configured to display information related to one or more performance parameters of the vehicle 114 in a field-of-view of the occupant (such as the driver or the passenger) of the vehicle 114. In an embodiment, the heads-up display 326 may include a transparent display surface on which the information may be projected. In an embodiment, the heads-up display 326 may be integrated with the multilayer surface 328. In another embodiment, the heads-up display 326 may be a separate transparent display layer that may overlap with a portion of the multilayer surface 328. Examples of the heads-up display 326 may include, but are not limited to, a laser scanning heads-up display, a holographic waveguide heads-up display, a projection-type heads-up display, and a micro-display imaging technology-based heads-up display. Example of the information displayed on the heads-up display 326 may include, but are not limited to, navigation data, vehicle performance data, fuel gauge data, environment data, traffic data, obstacle data, incoming call data, or any other data that may be critical to the occupant for driving the vehicle 114.

In operation, the signal processor 318 of the control system 302 may be configured to receive the plurality of signals from the plurality of sensors 314 via the head unit 304 and the user device 306. The signal processor 318 may further receive the media content projectable by the projection device 310 and the projection data 318A associated with the media content via the head unit 304 and the user device 306. The projection data 318A may include the contrast control information associated with the media content. Further, the shade and light controller 320 of the control system 302 may receive the plurality of signals and the projection data 318A via the head unit 304 and the user device 306. The signal processor 318 may further transmit the processed plurality of signals and the projection data 318A to the projection controller 322 and the local dimming controller 324.

In accordance with an embodiment, the plurality of sensors 314 may track a position of the external light source (such as the sun) with respect to a position of the occupant (such as the driver or the passenger) of the enclosed space 116 of the vehicle 114. The shade and light controller 320 of the control system 302 may receive the plurality of signals from the plurality of sensors 314 based on the tracked position of the external light source with respect to the position of the occupant. Based on the plurality of signals, the shade and light controller 320 may determine a position and an amount of glare caused by the external light source with respect to the occupant of the enclosed space 116 as the ambient light condition. The shade and light controller 320 may further control the multilayer surface 330 based on the determination of the position and the amount of glare caused by the external light source with respect to the occupant. Details of the control of the multilayer surface 330 based on the tracked position of the external light source are further described for example, in FIGS. 4A-4C.

In accordance with an embodiment, the plurality of sensors 314 may be configured to detect the ambient brightness of the enclosed space 116 as the ambient condition based on the output of the plurality of sensors 314 (such as an ambient light sensor). The shade and light controller 320 of the control system 302 may receive information related to a weather condition at a geo-location of an occupant of the enclosed space 116 from the weather information database 316B of the server 316. The shade and light controller 320 may select the one or more portions of the multilayer surface 330 based on the detected ambient brightness and the received information. Based on the detected ambient brightness and the received information, the shade and light controller 320 may further control the opacity level of the multilayer surface 330. In some embodiments, the shade and light controller 320 may further control the opacity level of a second multilayer surface different than the multilayer surface 330, based on the detected ambient brightness and the received information. Details of the control of the multilayer surface 330 and the second multilayer surface are further described for example, in FIGS. 5A and 5B.

In accordance with an embodiment, the control system 302 may receive a user input from the occupant of the enclosed space 116 via, for example, the user device 306. The user input may correspond to selection of the multilayer surface 334 as the projection surface for projection of the media content. The projection controller 322 may be configured to control the projection device 310 to project the media content on the multilayer surface 334. The local dimming controller 324 may control the local dimming driver 312 to select one or more portions of at least one layer of the multilayer surface 334, based on the projection data 318A and the position of the occupant with respect to the multilayer surface 334. The local dimming controller 324 may further control the local dimming driver 312 to control the color or the opacity level of the selected one or more portions of the multilayer surface 334, based on the projection data 318A. Details of the control of the multilayer surface 334, based on position of one or more occupants are further described for example, in FIGS. 6A and 6B.

In accordance with an embodiment, the local dimming controller 324 may further synchronize the selection of the one or more portions of the multilayer surface 334 and the control of the opacity level of the selected one or more portions with a playback of the media content projected on the projection surface (such as the multilayer surface 334). Details of the control of the multilayer surface 334 based on the synchronization are further described for example, in FIGS. 7A and 7B.

In accordance with an embodiment, the control system 302 may further determine at least one ambient condition of the enclosed space 116 of the vehicle 114 based on the processed plurality of signals. Specifically, in an embodiment, the shade and light controller 320 may determine the ambient condition of the enclosed space 116 based on the plurality of signals received via the head unit 304 and the signal processor 318. In accordance with an embodiment, the shade and light controller 320 of the control system 302 may be configured to determine an amount of incident light on the heads-up display 326 from an external light source (such as the sun) exceeds a threshold. The shade and light controller 320 may further control a color or the opacity level of the one or more portions of the multilayer surface 328 which includes the heads-up display 326, based on the determination. Details of the control of the multilayer surface 328 which includes the heads-up display 326 are further described for example, in FIGS. 8A and 8B.

Figure 4A:
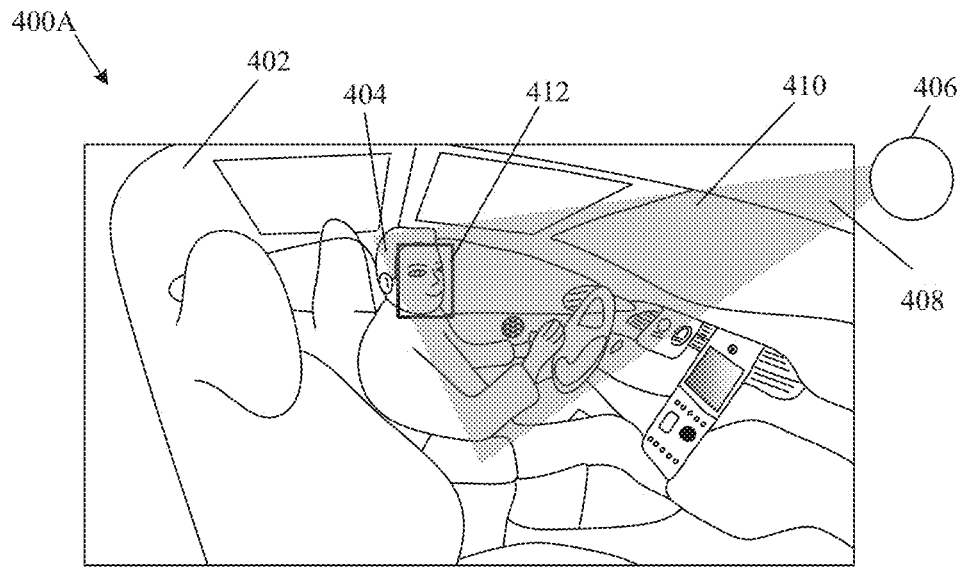
FIGS. 4A-4C are diagrams that illustrate exemplary scenarios for detection and control of an ambient light condition of an enclosed space of a multilayer surface for an enclosed space, based on a tracked position of an external light source, in accordance with an embodiment of the disclosure.

FIG. 4A is a diagram that illustrates an exemplary scenario for detection and control of an ambient light condition of an enclosed space, based on a tracked position of an external light source, in accordance with an embodiment of the disclosure. FIG. 4A is described in conjunction with elements from FIGS. 1, 2, and 3. With reference to FIG. 4A, there is shown a scenario 400A. In the scenario 400A, there is shown a vehicle 402, an occupant 404 of the vehicle 402, and an external light source 406. In the scenario 400A, there is further shown the external light source 406, a first multilayer surface 410 corresponding to the front glass of the vehicle 402, and a portion of light 408 incident on the front glass of the vehicle 402.

The vehicle 402 may include a plurality of sensors (such as the plurality of sensors 314) which may be positioned at different positions on the vehicle 402. The plurality of sensors 314 may include intelligent sensors (such as a smart image sensor with event detection and/or an event camera), a light detection and ranging (LiDAR) sensor, an audio sensor, a radio detection and ranging (RADAR) sensor, a location sensor (such as a GPS sensor), an IR sensor, an ambient light sensor (such as a photodetector), an ultrasonic sensor, or an audio sensor (such as a microphone). The circuitry 204 may receive the plurality of signals generated by the plurality of sensors 314 at regular intervals or based on generation of an event detection by the event camera.

In an embodiment, the smart image sensor may be positioned in an interior portion (such as the enclosed space 116) or at an exterior portion of the vehicle 402. The smart image sensor may be either a single wide field-of-view camera or multiple wide field-of-view cameras (such as a 360-degree camera or a spherical camera) mounted on the body of the vehicle 402. The wide field-of-view camera may capture a 360 degree image or a spherical image around the vehicle 402 in X-axis, Y-axis and Z-axis directions, and thus concurrently capture multiple directions around the vehicle 402. For example, the smart image sensor may detect a position of the external light source 406 (such as the sun), and thus detect a direction of the light 408 incident on the vehicle 402. The smart image sensor may further detect a position of the occupant 404 in the vehicle 402. For example, the smart image sensor may record the plurality of signals based on the detected position of the external light source 406 (such as the sun) with respect to the occupant 404. The smart image sensor may generate one or more images based on the captured objects, such as, the occupant 404 and the external light source 406 to continuously track the position of the external light source 406. In an embodiment, the image captured by the smart image sensor may be subjected to image segmentation for detection and identification of the objects. Based on the detected position of the external light source 406 and the position of the occupant 404, the circuitry 204 may determine a direction of the light 408 incident on the vehicle 402 on a face 412 of the occupant 404. In addition to the detected positions, the circuitry 204 may receive signals from the IR sensor and/or the ambient light sensor (such as the photodetector), and determine the position and amount of the glare caused by the external light source 406 on the face 412 of the occupant 404.

In an embodiment, the RADAR sensor may be utilized to detect objects, such as other vehicles traveling in the opposite direction of the vehicle 402. The smart image sensor may also detect the glare caused from headlights of the oncoming vehicles. The LiDAR sensor may be configured to measure the distance of an object (such as a vehicle) from the vehicle 402 by illuminating the object with light (e.g. laser light) and by measuring return times and wavelengths of the reflected light. The circuitry 204 may utilize the measurement of the distance, in conjunction with signals from the photodetector, to determine an amount of glare incident on the face 412 of the occupant 404 from the external light source (such as the headlights of the oncoming vehicles).

In an embodiment, the location sensor may be integrated with the native electronic control unit (not shown) of the vehicle 402 or may be a standalone sensor. The location sensor may be utilized to record a current geo-location of the vehicle 402. The circuitry 204 may utilize the current geo-location of the vehicle 402 to retrieve the weather condition (such as bright sunny, or cloudy) at the geo-location of the vehicle 402 from the server 118, at regular intervals. In an embodiment, the pressure sensor may be embedded in the seat of the vehicle 402, a door of the vehicle 402, a steering wheel of the vehicle 402, an armrest in the vehicle 402, etc. The circuitry 204 may utilize a signal from the pressure sensor to determine presence and position of the occupant 404 in the vehicle 402.

In accordance with an embodiment, the plurality of sensors 314 (such as the smart image sensor and/or the photodetector) may be configured to track the position of the external light source 406 (such as the sun) with respect to the position of the occupant 404 of the enclosed space 116 of the vehicle 402. The circuitry 204 may receive the plurality of signals from the plurality of sensors 314 based on the tracked position of the external light source 406 with respect to the position of the occupant 404. Based on the plurality of signals (from the image sensor, the photodetector, location sensor, and so on), the circuitry 204 may further determine the position and the amount of the glare caused by the external light source 406 with respect to the occupant 404 (such as on the face 412 of the occupant 404) as the ambient condition. The amount of glare may be determined, for example, in terms of lumen per unit area (lux) of the ambient light sensor (such as the photodetector) or any other unit of measurement. In another example, the amount of glare may be determined, for example, by a combination of outputs from the photodetector and the IR sensor. The circuitry 204 may further determine one or more portions of the first multilayer surface 410 on which the light 408 from the external light source is incident, based on the determined position and the amount of the glare with respect to the occupant 404.

As shown in FIG. 4A, the ambient condition may correspond to the ambient light condition of the enclosed space 116 of the vehicle 402. The ambient light condition in the enclosed space 116 may vary due to the amount of the light 408 entering inside the enclosed space 116 of the vehicle 402. In this scenario 400A, the first multilayer surface 410 may correspond to the front glass of the vehicle 402, and the glare caused by the light 408 may be incident on the face 412 of the occupant 404 via the front glass of the vehicle 402.

Figure 4B:
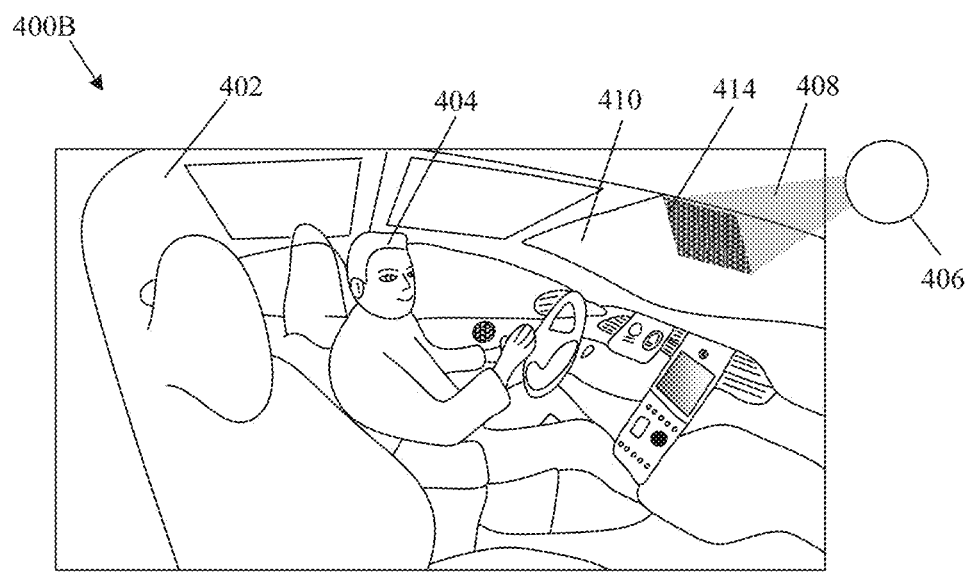

FIG. 4B is a diagram that illustrates an exemplary scenario for detection and control of an ambient light condition of an enclosed space, based on a tracked position of the external light source, in accordance with an embodiment of the disclosure. FIG. 4B is described in conjunction with elements from FIGS. 1, 2, 3, and 4A. With reference to FIG. 4B, there is shown a scenario 400B. In the scenario 400B, there is shown the vehicle 402, the occupant 404, and the external light source 406 (such as the sun). The circuitry 204 may select one or more portions, such as a first portion 414 of the first multilayer surface 410, based on the determined position and the determined amount of the glare from the external light source 406. In some embodiments, the selected first portion 414 of the first multilayer surface 410 may correspond to the determined position of the glare with respect to the occupant 404. For example, the selected first portion 414 may correspond to a portion of the front glass of the vehicle 402, which may be near a line of sight of the occupant 404. Thus, the selected first portion 414 may be the portion through which the light 408 may be incident on the face 412 of the occupant 404.

In one or more embodiments, the first multilayer surface 410 may correspond to one of the partition glass between the front section and the rear section of the enclosed space 116, the front glass of the enclosed space 116, the rear glass of the enclosed space 116, the roof window of the enclosed space 116, or the side window of the enclosed space 116 of the vehicle 402. As shown in FIGS. 4A and 4B, the first multilayer surface 410 may correspond to the front glass of the vehicle 402, through which the light 408 may be incident on the face 412 of the occupant 404 (such as the driver or the passenger). In some embodiments, the plurality of layers of the first multilayer surface 410 may include at least one liquid crystal layer and at least one suspended particle devices layer.

As shown in FIG. 4B, the circuitry 204 may further control the opacity level of the selected first portion 414 of the first multilayer surface 410. The control of the opacity level of the first portion 414 may correspond to the determined amount of the glare caused by the incident light 408. Thus, the opacity level (such as 40% opacity or 60% opacity) of the first portion 414 may be controlled in such a manner that the amount of the glare (in terms of lumen per unit area) on the face 412 of the occupant 404 may be minimized. Further, the control of the opacity level may be such that a visibility of the road by the occupant 404 may be improved.

In some embodiments, the circuitry 204 may control the opacity level of each layer of the plurality of layers to change a color of the first multilayer surface 410. The circuitry 204 may control the opacity level of each layer of the first multilayer surface 410 to change the color of the first multilayer surface 410 by application of a different amount of voltage to each layer of the first multilayer surface 410. In one or more embodiments, the plurality of layers of the first multilayer surface 410 may include at least one liquid crystal (LC) layer and at least one suspended particle devices (SDP) layer. For example, the LC layer of the first multilayer surface 410 may be white in color when no voltage is applied to the LC layer. The SPD layer of the first multilayer surface 410 may be opaque and black in color when no voltage is applied to the SPD layer. In an exemplary scenario, the circuitry 204 may control a first layer in the first multilayer surface 410 to become 10% transparent based on an application of a first amount of voltage on the first layer, via the shade and light controller 320 (as shown in FIG. 3). In another example, the circuitry 204 may control the first layer in the first multilayer surface 410 to become 35% transparent based on an application of a second amount of voltage. In some embodiments, the second amount of voltage may be more than the first amount of voltage. In some cases, an increase in the amount of voltage applied to the first layer may decrease the opacity level of the first layer of the first multilayer surface 410. Thus, the circuitry 204 may individually control the opacity level of each layer of the first multilayer surface 410, based on the amount of applied voltage.

Figure 4C:
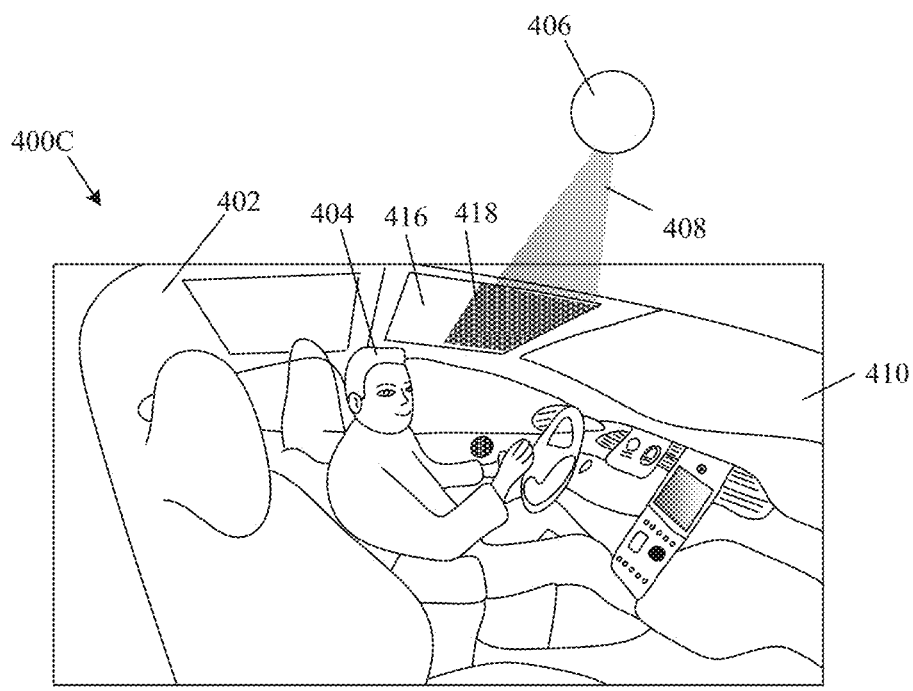

FIG. 4C is a diagram that illustrates an exemplary scenario for detection and control of an ambient light condition of an enclosed space, based on a tracked position of an external light source, in accordance with an embodiment of the disclosure. FIG. 4C is described in conjunction with elements from FIGS. 1, 2, 3, 4A, and 4B. With reference to FIG. 4C, there is shown a scenario 400C. In the scenario 400C, there is shown the vehicle 402, the occupant 404, and the external light source 406 (such as the sun). The vehicle 402 may include a second multilayer surface 416. In an embodiment, the second multilayer surface 416 may correspond to the roof window or the front side window of the vehicle 402. In the scenario 400C, the position of the external light source 406 with respect to the position of the occupant 404 may be different than the position of the external light source 406 with respect to the position of the occupant 404, as shown in FIGS. 4A and 4B. As shown in FIG. 4C, the light 408 from the external light source 406 may be incident on the enclosed space 116 of the vehicle 402 via the second multilayer surface 416 that corresponds to the front side window. In such a case, the glare may be caused on the face of 412 the occupant 404 via the second multilayer surface 416.

In accordance with an embodiment, the circuitry 204 may change the selection of the first portion 414 of the first multilayer surface 410 based on a change in the tracked position of the external light source 406. As the position of the external light source 406 changes, for example, due to change in a direction of the vehicle 402, the selection of the multilayer surface to be controlled may be changed. In one or more embodiments, the circuitry 204 may select the first portion 418 of the second multilayer surface 416 based on the change in the tracked position of the external light source 406 with respect to the position of the occupant 404.

The circuitry 204 may further change the opacity level of the selected first portion 418 of the second multilayer surface 416 (corresponding to the front side window) of the enclosed space 116, based on the change in the position of the glare caused by the external light source 406 with respect to the position of the occupant 404. In the scenario 400C, the circuitry 204 may control the first portion 414 of the first multilayer surface 410 to become transparent, when the position of the glare is shifted towards the second multilayer surface 416. In the another embodiment, the circuitry 204 may decrease the opacity level of the first portion 414 of the first multilayer surface 410, and may increase the opacity level of the first portion 418 of the second multilayer surface 416 in case the glare is incident on the occupant 404 via the second multilayer surface 416. Further, the opacity level of the first portion 418 of the second multilayer surface 416 may be controlled based on a change in the determined amount of the glare. For example, the amount of glare (such as 100,000 lux) on the first portion 418 of the second multilayer surface 416 at a time instant may be less than the amount of the glare (such as 90,000 lux) on the first portion 414 of the first multilayer surface 410 at the time instant. In such a case, the circuitry 204 may control the opacity level of the first portion 418 of the second multilayer surface 416 to be less than the opacity level of the first portion 414 of the first multilayer surface 410.

Figure 5A:
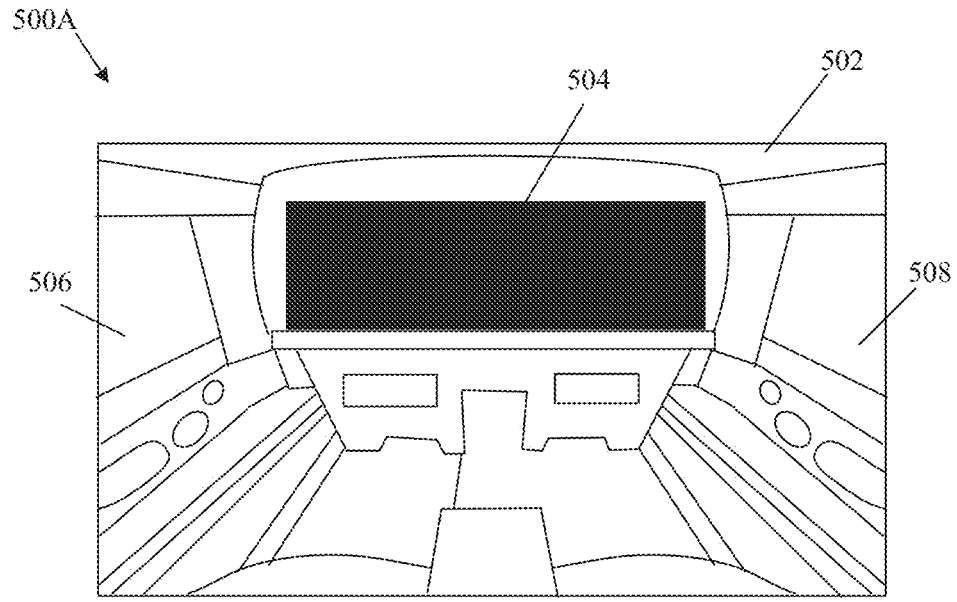
FIGS. 5A and 5B are diagrams that illustrate exemplary scenarios for control of a first multilayer surface and a second multilayer surface in an enclosed space, based on an ambient condition, in accordance with an embodiment of the disclosure.

FIG. 5A is a diagram that illustrates an exemplary scenario for control of a first multilayer surface and a second multilayer surface, based on an ambient condition, in accordance with an embodiment of the disclosure. FIG. 5A is described in conjunction with elements from FIGS. 1, 2, 3, 4A, 4B, and 4C. With reference to FIG. 5A, there is shown a scenario 500A. In the scenario 500A, there is shown a vehicle 502. The vehicle 502 may include a first multilayer surface 504, a second multilayer surface 506 and a third multilayer surface 508.

In accordance with an embodiment, the first multilayer surface 504 may correspond to the front glass of the enclosed space 116. In the scenario 500A, the first multilayer surface 504 may correspond to the partition glass of the vehicle 502 as shown in FIG. 5A. The second multilayer surface 506 and the third multilayer surface 508 may further correspond to the left side window and the right side window of the enclosed space 116 of the vehicle 502, as shown in FIG. 5A. In another embodiment, the second multilayer surface 506 and the third multilayer surface 508 may correspond to the roof window of the enclosed space 116 of the vehicle 502. The second multilayer surface 506 may further correspond to the rear glass of the vehicle 502.

In accordance with an embodiment, the plurality of sensors 314 may be configured to detect the ambient condition as an ambient brightness of the enclosed space 116 of the vehicle 502. The plurality of sensors 314 (such as the ambient light sensor, the image sensor, the IR sensor, and/or the location sensor) may detect the ambient brightness of the enclosed space 116 based on, for example, the intensity of sunlight incident on the vehicle 502 (for example, on the front glass, the roof window, the left side window, the right side window, and/or the rear glass of the vehicle 502), the temperature at the geo-location of the vehicle 502, the activation state of one more cabin lights of the vehicle 502, and the position of the external light source (such as the sun) with respect to the occupant. In an embodiment, the circuitry 204 may determine the ambient brightness of the enclosed space 116 based on the signals from plurality of sensors 314. In another embodiment, the circuitry 204 may determine the ambient brightness of the enclosed space 116 based on a signal from the ambient light sensor positioned within the enclosed space 116, or based on a signal from the image sensor that may capture a portion of the enclosed space 116.

The circuitry 204 may determine the geo-location of the vehicle 502 based on the output of the GPS sensor, and retrieve information related to a weather condition (such as temperature, humidity, sunny, overcast, etc.) at the geo-location of the occupant of the vehicle 502 from the server. The information related to the weather condition may include at least an intensity of sunlight. For example, the received information may include temperature of the geo-location, such as "86 degrees Fahrenheit and sunny". In another example, the retrieved information may include temperature of the geo-location, such as "64 degrees Fahrenheit and cloudy". Based on the retrieved information and the determined ambient condition, the circuitry 204 may select one or more portions of the first multilayer surface 504, the second multilayer surface 506, and the third multilayer surface 508. In some embodiments, the circuitry 204 may select the entire first multilayer surface 504 that may correspond to the partition glass of the vehicle 502, as shown in FIG. 5A.

The circuitry 204 may control the opacity level of the one or more portions of the first multilayer surface 504 corresponding to the partition glass of the vehicle 502 as, based on the detected ambient brightness and the retrieved information. For example, the opacity level of the first multilayer surface 504 may be set to 80%, based on the detection of the ambient brightness and the retrieved information (such as "86 degrees Fahrenheit and sunny". Further, the opacity level of the first multilayer surface 504 may be set to 40%, based on the detection of the ambient brightness and the retrieved information (such as "64 degrees Fahrenheit and cloudy"). Thus, the opacity level of the first multilayer surface 504 may be controlled based on the ambient brightness and the received information.

Figure 5B:
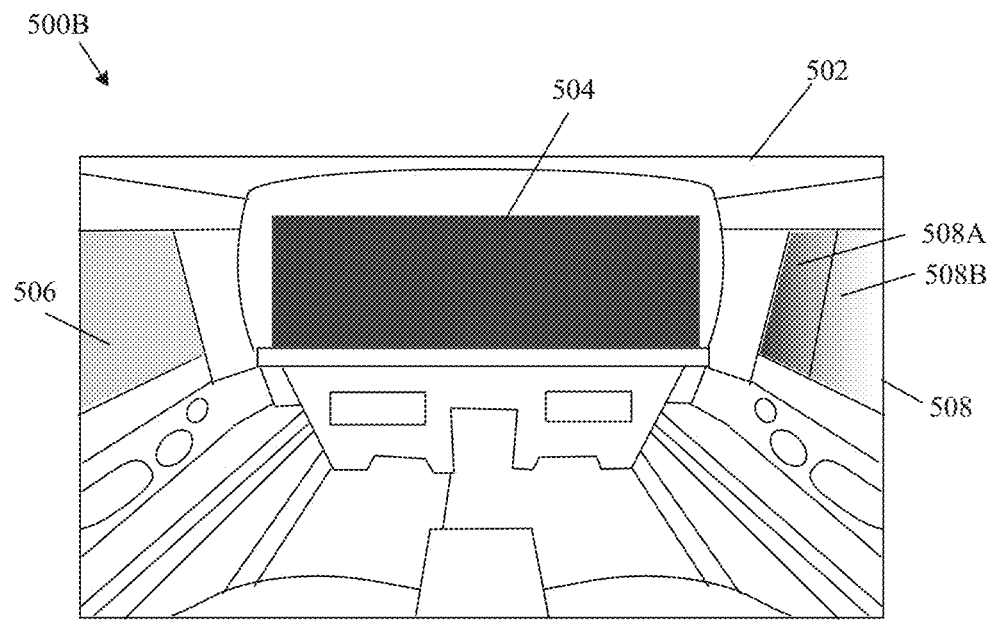

FIG. 5B is a diagram that illustrates an exemplary scenario for control of a first multilayer surface and a second multilayer surface, based on an ambient condition, in accordance with an embodiment of the disclosure. FIG. 5B is described in conjunction with elements from FIGS. 1, 2, 3, 4A, 4B, 4C, and 5A. With reference to FIG. 5B, there is shown a scenario 500B. In the scenario 500B, there is shown the vehicle 502. The vehicle 502 may include the first multilayer surface 504, the second multilayer surface 506 and the third multilayer surface 508. In accordance with an embodiment, the circuitry 204 may further select one or more portions of the second multilayer surface 506 and one or more portions (such as a first portion 508A and a second portion 508B) of the third multilayer surface 508, based on the detected ambient brightness and the received information.

The circuitry 204 may further control the opacity level of the second multilayer surface 506 and the one or more portions of the third multilayer surface 508 based on the detected ambient brightness and the retrieved information, as shown in FIG. 5B. For example, the opacity level of the first multilayer surface 504 may be set higher compared to the second multilayer surface 506 and the third multilayer surface 508, based on the detection that the amount of light incident on the first multilayer surface 504 may be the highest. In another example, the opacity level of the second multilayer surface 506 may be set lower compared to the first multilayer surface 504 and the third multilayer surface 508, based on the detection that the amount of sunlight incident on the second multilayer surface 506 may be the lowest.

In another example, the circuitry 204 may set the opacity level of the first portion 508A of the third multilayer surface 508 to be higher than the opacity level of the second portion 508B of the third multilayer surface 508, based on the detection that the amount of sunlight incident on the first portion 508A may be more than the second portion 508B. Thus, the circuitry may maintain the ambient brightness of the enclosed space 116 of the vehicle 502 in accordance with the weather condition at the geo-location of the occupant of the vehicle 502. The circuitry 204 may individually and variably control the opacity level of each multilayer surface, such as the first multilayer surface 504, the second multilayer surface 506, and the third multilayer surface 508 to maintain a constant brightness level in the enclosed space 116 of the vehicle 502. In an embodiment, the circuitry 204 may access the memory 206 to retrieve past information related to preference of each occupant (such as preferred cabin brightness level with respect to each occupant) of the vehicle 502. The circuitry 204 may then variably control the opacity level of each multilayer surface, such as the first multilayer surface 504, the second multilayer surface 506, and the third multilayer surface 508 of the vehicle 502 to maintain the preferred cabin brightness level in the enclosed space 116 of the vehicle 502. In another embodiment, the circuitry 204 may dynamically control cabin brightness level in the enclosed space 116 of the vehicle 502 based on whether projection of a media content on the first multilayer surface 504 has started, as described, for example, in FIGS. 6A and 6B.

In another embodiment, the circuitry 204 may further control one or all the multilayer surfaces (such as the first multilayer surface 504, the second multilayer surface 506, and the third multilayer surface 508) of the enclosed space 116 of the vehicle to become fully transparent by a single user command, such as, a voice command, a gesture command, or a touch input command. The circuitry 204 may receive the gesture command from the plurality of sensors 314 (such as the image sensor) or may receive the voice command from the plurality of sensors 314 (such as the audio sensor), and may recognize the gesture command or the voice command as user input to make one or all the multilayer surfaces of the enclosed space 116 fully transparent. The multilayer surfaces (such as the first multilayer surface 504, the second multilayer surface 506, and the third multilayer surface 508) may be made fully transparent by the single user command for emergency or refresh purposes. The circuitry 204 may also receive the user command (such as touch input command) via the user device 306 (shown in FIG. 3) to make one or all multilayer surfaces of the enclosed space 116 fully transparent.

Figure 6A:
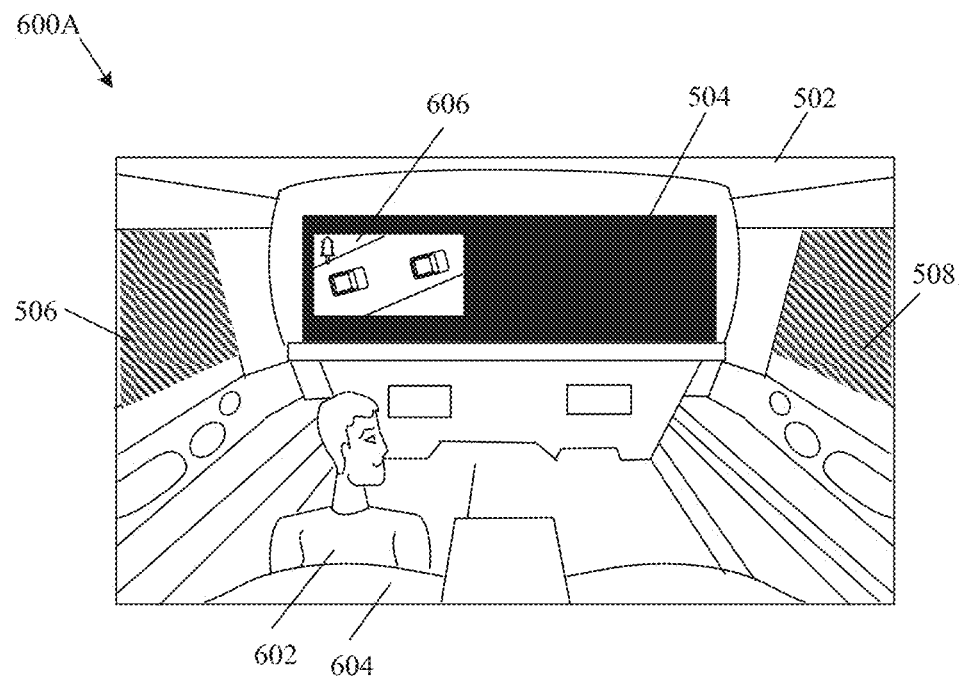
FIGS. 6A and 6B are diagrams that illustrate exemplary scenarios for control of a multilayer surface in an enclosed space for projection of media content, based on position of one or more occupants, in accordance with an embodiment of the disclosure.

FIG. 6A is a diagram that illustrates an exemplary scenario for control of a first multilayer surface for projection of media content, based on position of one or more occupants, in accordance with an embodiment of the disclosure. FIG. 6A is described in conjunction with elements from FIGS. 1, 2, 3, 4A, 4B, 4C, 5A and 5B. With reference to FIG. 6A, there is shown a scenario 600A. In the scenario 600A, there is shown the vehicle 502 which may include the first multilayer surface 504, the second multilayer surface 506 and the third multilayer surface 508. The vehicle 502 may further include a first seat 604 occupied by a first occupant 602.

The circuitry 204 may be configured to receive the user input from the first occupant 602 of the enclosed space 116 of the vehicle 502. The user input may correspond to selection of the first multilayer surface 504 as a projection surface for projection of a media content 606 by a projector (such as the projection device 310 shown in FIG. 3). In an example, the circuitry 204 may stream the media content 606 from the media content database 316A of the server 316 or cast the media content 606 from the user device 306. The circuitry 204 may select the one or more portions of at least one layer of the first multilayer surface 504, based on the projection data 318A associated with the media content 606 and a position of the first occupant 602 with respect to the first multilayer surface 504. For example, the circuitry may determine that the first occupant 602 has occupied the first seat 604 (for example, the left side seat) of the vehicle 502 based on a signal (such as image signal, or an electrical signal) from the plurality of sensors 314 (such as an image sensor, or a pressure sensor). In such a case, the position of the first occupant 602 with respect to the first multilayer surface 504 may be a left side of the vehicle 502. Thus, the circuitry 204 may select a portion (such as the left side portion) of the first multilayer surface 504 for the projection of the media content 606, as shown in FIG. 5A.

In accordance with an embodiment, the projection surface may correspond to at least one of the partition glass, the front glass of the enclosed space 116, the roof window of the enclosed space 116, or the side window of the enclosed space 116 of the vehicle 502. In an embodiment, the projection surface and the portion of the projection surface may be selected based on user input. For example, the occupant may prefer to watch the media content in a smaller size on the left hand portion of the first multilayer surface 504. The circuitry 204 may receive user input (such as voice command or gesture-based hand swipe) from the plurality of sensors 314 (such as the microphone or the image sensor), and may recognize the voice command or the hand swipe as the user input to reduce the projection area of the projection surface. The circuitry 204 may also receive user input via the user device 306 (shown in FIG. 3). In another example, the occupant may prefer to watch the media content in a larger size on the entirety of the first multilayer surface 504. The circuitry 204 may receive user input (such as voice command or gesture-based hand swipe) from the plurality of sensors 314 (such as the microphone or the image sensor), and may recognize the voice command or the hand swipe as the user input to enlarge the projection area of the projection surface.

The circuitry 204 may further control at least one of a color of the first multilayer surface 504 or the opacity level of the selected one or more portions of at least one layer of the first multilayer surface 504, based on the projection data 318A (obtained from the signal processor 318 shown in FIG. 3). In case the first multilayer surface 504 is selected as the projection surface, the opacity level of the first multilayer surface 504 may be 100% and the color of the first multilayer surface 504 may be black. In some embodiments, the opacity level of the first multilayer surface 504 may be 100% and the color of the first multilayer surface 504 may be white. In one or more embodiments, according to scenario 600A, the opacity level of the left side portion of the first multilayer surface 504 on which the media content is projected may be set to 80%, and the right side portion of the first multilayer surface 504 may be set to 20%, based on user input or pre-stored preference of the first occupant 602. Thus, the circuitry 204 may be configured to control the color (such as the whiteness or blackness) of the first multilayer surface 504, a size of the projection area, and the opacity level of different portions of the first multilayer surface 504, based on the projection data and/or the user input.

In an embodiment, the circuitry 204 may further dynamically control the opacity level of the roof window of the vehicle 502, so as to maintain a constant brightness level in the enclosed space 116, during the playback of the media content 606. In another embodiment, based on the user input via the user device 306, the roof window may be used as a projection screen to project ambient visuals. The projected ambient visuals may be related to the media content 606 being played on the first multilayer surface 504, or may be an image or video selected based on the environment (e.g. starry night sky, blue sky, or rain) outside the enclosed space 116 of the vehicle 502. The circuitry 204 may further dynamically control the opacity level of the second multilayer surface 506 (corresponding to the left side window) and the third multilayer surface 508 (corresponding to the left side window) of the vehicle 502, so as to maintain a constant brightness level in the enclosed space 116, during the playback of the media content 606, thereby providing an improved viewing experience to the first occupant 602.

Figure 6B:
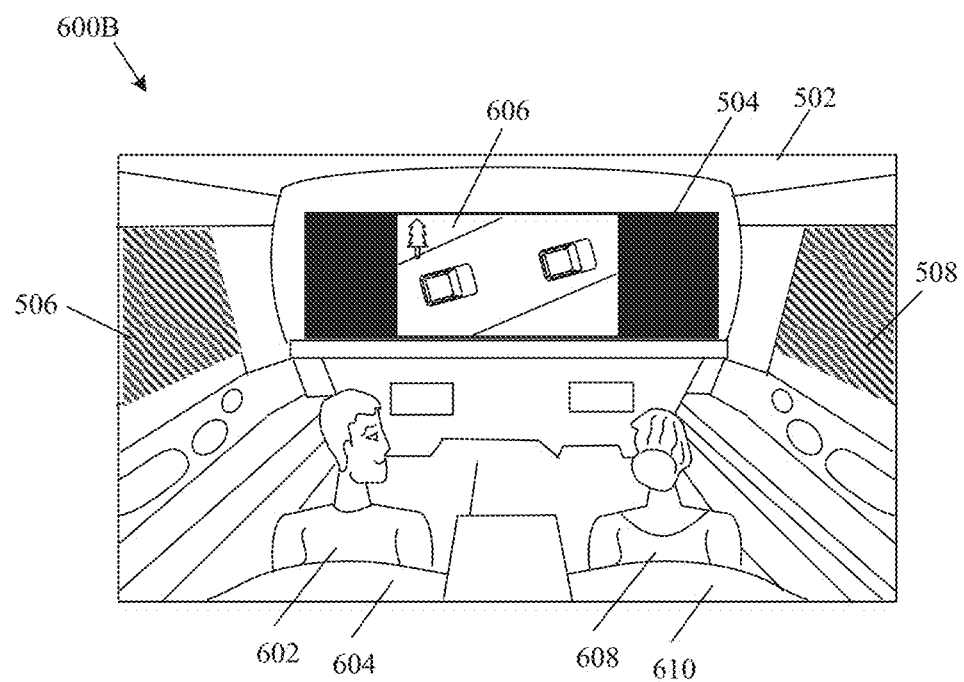

FIG. 6B is a diagram that illustrates an exemplary scenario for control of a first multilayer surface for projection of media content, based on position of one or more occupants, in accordance with an embodiment of the disclosure. FIG. 6B is described in conjunction with elements from FIGS. 1, 2, 3, 4A, 4B, 4C, 5A, 5B, and 6A. With reference to FIG. 6B, there is shown a scenario 600B. In the scenario 600B, there is shown the vehicle 502. In the scenario 600B, the vehicle 502 may include a second seat 610 occupied by a second occupant 608, in addition to the first seat 604 occupied by the first occupant 602. For example, the circuitry may determine that the second occupant 608 has occupied the second seat 610 (for example, a right side seat) of the vehicle 502 based on a signal (such as image signal, or an electrical signal) from the plurality of sensors 314 (such as an image sensor, or a pressure sensor). The circuitry 204 may select the entirety of the first multilayer surface 504 as the projection surface for the projection of the media content 606, based on the presence and the positions of the first occupant 602 and the second occupant 608 in the enclosed space 116 of the vehicle 502. In another embodiment, the circuitry 204 may select a substantial portion (such as 60-70%) of the first multilayer surface 504 as the projection surface for the projection of the media content 606, to maintain a similar aspect ratio of the media content as compared to scenario 600A. Thus, the circuitry 204 may provide an enhanced viewing experience on the large projection area of the first multilayer surface 504, such that the first occupant 602 and the second occupant 608 may concurrently view the same media content 606 from their respective seats comfortably.

Figure 7A:
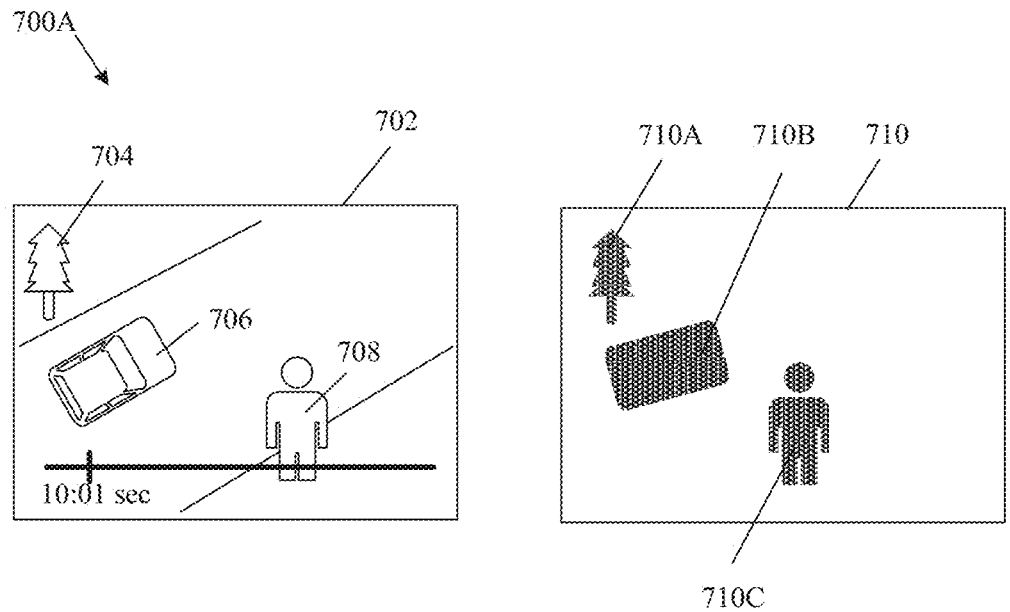
FIGS. 7A and 7B are diagrams that illustrate exemplary scenarios for control of a multilayer surface in an enclosed space, based on projection data associated with media content, in accordance with an embodiment of the disclosure.

FIG. 7A is a diagram that illustrates an exemplary scenario for control of a multilayer surface, based on projection data associated with media content, in accordance with an embodiment of the disclosure. FIG. 7A is described in conjunction with elements from FIGS. 1, 2, 3, 4A, 4B, 4C, 5A, 5B, 6A, and 6B. With reference to FIG. 7A, there is shown a scenario 700A. In the scenario, there is shown a media content 702. The media content 702 may display objects, such as, a tree 704, a car 706, and a person 708. In the scenario 700A, there is further shown a first multilayer surface 710 as a projection surface on which the media content 702 may be projected. The first multilayer surface 710 may correspond to the first multilayer surface 504 in the enclosed space 116 of the vehicle 502, as described in FIGS. 6A and 6B.

The media content 702 may be projected on the first multilayer surface 710 by the projection device 310, for example, based on user input. In an example, the circuitry 204 may stream the media content 702 from the media content database 316A of the server 316 or cast the media content 702 from the user device 306. In accordance with an embodiment, the circuitry 204 may synchronize the selection of the one or more portions of at least one layer of the first multilayer surface 710 and the control of the opacity level of the selected one or more portions with a playback of the media content 702 projected on the first multilayer surface 710. The circuitry 204 may receive the projection data 318A (such as the contrast control information) associated with the media content 702 from the signal processor 318, may perform the synchronization based on the projection data 318A (such as data related to one or more objects) in the media content 702.

In an exemplary scenario, at a first time instant (such as at 10 minutes and 1 second) during the playback of the media content 702, the tree 704, the car 706 and the person 708 may be at first positions in the media content 702. The circuitry 204 may select, at the first time instant, one or more portions of the of the first multilayer surface 710, such as a first portion 710A of the first multilayer surface 710 corresponding to the tree 704, a second portion 710B of the first multilayer surface 710 corresponding to the car 706, and a third portion 710C of the first multilayer surface 710 corresponding to the person 708 in the media content 702. In this scenario 700A, the circuitry 204 may further control (e.g. increase) the opacity level to control a black and white tone level of the selected first portion 710A, the selected second portion 710B, and the selected third portion 710C of the first multilayer surface 710 in synchronization with the playback of the media content 702. Thus, the circuitry 204 may locally control the black and white tone level to dim one or more portions (such as the first portion 710A, the second portion 710B and the third portion 710C) of the first multilayer surface 710 to enhance a contrast level and a picture quality of the media content 702.

Figure 7B:
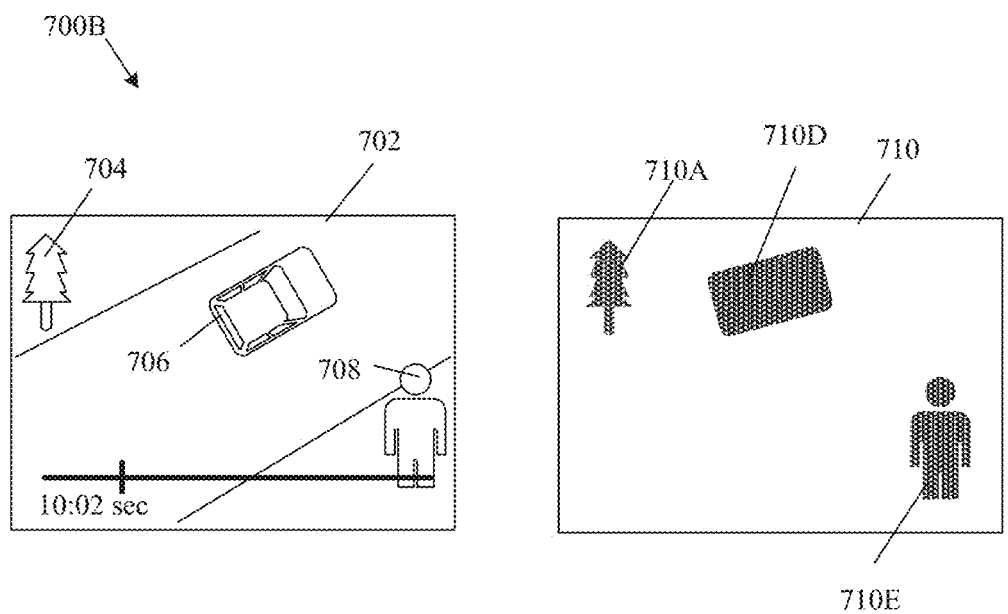

FIG. 7B is a diagram that illustrates an exemplary scenario for control of a first multilayer surface, based on projection data associated with media content, in accordance with an embodiment of the disclosure. FIG. 7B is described in conjunction with elements from FIGS. 1, 2, 3, 4A, 4B, 4C, 5A, 5B, 6A, 6B, and 7A. With reference to FIG. 7B, there is shown a scenario 700B. In the scenario 700B, there is shown the media content 702. In an exemplary scenario, at a second time instant (such as 10 minutes and 2 seconds) during the playback of the media content 702, the tree 704 may be at the first position, whereas the car 706 and the person 708 may be at second positions in the media content 702. The circuitry 204 may select, at the second time instant, a fourth portion 710D of the first multilayer surface 710 corresponding to the car 706 in the media content 702. The circuitry 204 further select a fifth portion 710E of the first multilayer surface 710 corresponding to the person 708 in the media content 702 at the second time instant. In this scenario 700B, the circuitry 204 may further control (e.g. increase) the opacity level to control the black and white tone level of the selected first portion 710A, the selected fourth portion 710D, and the selected fifth portion 710E of the first multilayer surface 710 in synchronization with the playback of the media content 702. Thus, the circuitry may control the opacity level one or more portions of the first multilayer surface 710 corresponding specific objects in the media content 702, such as the tree 704, the car 706, and the person 708 to become darker compared to remaining portions of the first multilayer surface 710, which may enhance the contrast level of the media content 702.

Figure 8A:
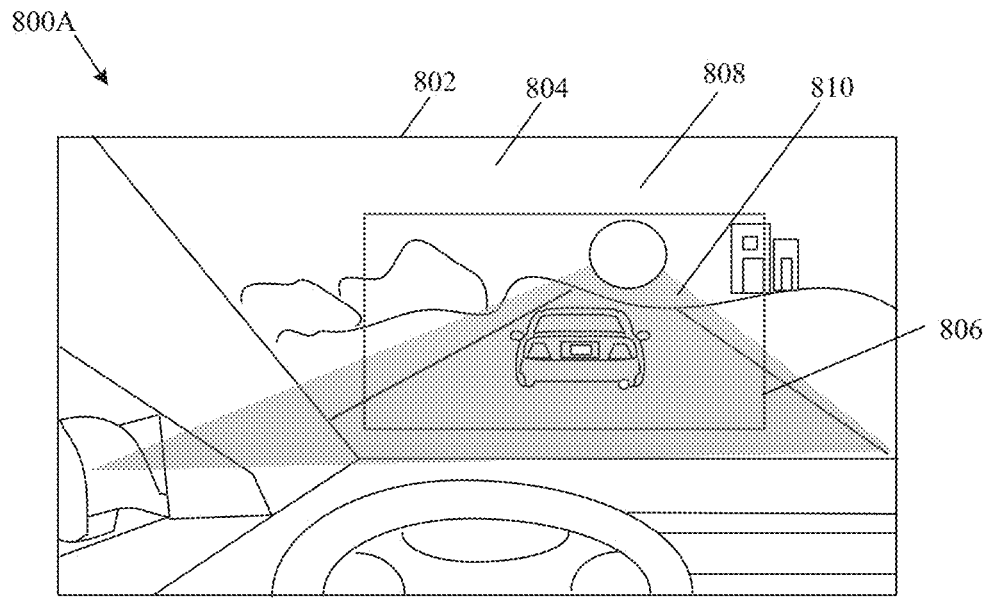
FIGS. 8A and 8B are diagrams that illustrate exemplary scenarios for control of a multilayer surface for an enclosed space that includes a heads-up display, in accordance with an embodiment of the disclosure.

FIG. 8A is a diagram that illustrates an exemplary scenario for control of a first multilayer surface for an enclosed space that includes a heads-up display, in accordance with an embodiment of the disclosure. FIG. 8A is described in conjunction with elements from FIGS. 1, 2, 3, 4A, 4B, 4C, 5A, 5B, 6A, 6B, 7A, and 7B. With reference to FIG. 8A, there is shown a scenario 800A. In the scenario 800A, there is shown a vehicle 802. The vehicle 802 may include a first multilayer surface 804 that corresponds to the front glass (such as the windshield) of the vehicle 802. In the scenario 800A, there is further shown a heads-up display 806. The heads-up display 806 may be integrated with or separate from the first multilayer surface 804. In the scenario 800A, there is further shown an external light source 808 (such as the sun). The external light source 808 may emit a portion of incident light 810.

In accordance with an embodiment, the circuitry 204 may receive a plurality of signals (such as signals associated with a position of an occupant in the vehicle 802, a position of the external light source 808 with respect to a position of the occupant) from the plurality of sensors 314 (such the smart image sensor). Based on the plurality of signals, the circuitry 204 may determine that the position of the external light source 808 with respect to the position of the occupant at regular intervals. The circuitry may further determine an amount of the incident light 810 on the heads-up display 806 from the external light source 808 exceeds a threshold. In an embodiment, the threshold may be defined based on multiple values of luminance data which may cause different amounts of glare to human eyes. For example, the threshold may be set at 50% of the maximum lux associated with the sun (e.g. 100,000 lux). The circuitry 204 may determine the amount of the incident light 810 on the heads-up display 806 to be greater than the threshold. In such a case, the occupant (such as the driver or the passenger) of the vehicle 802 may experience glare and difficulty in viewing content (e.g. speed, mileage) of the heads-up display 806. Further, the occupant of the vehicle 802 may also experience difficulty viewing other objects in front of the vehicle 802, such as vehicles on the street ahead, due to the glare caused by the incident light 810.

Figure 8B:
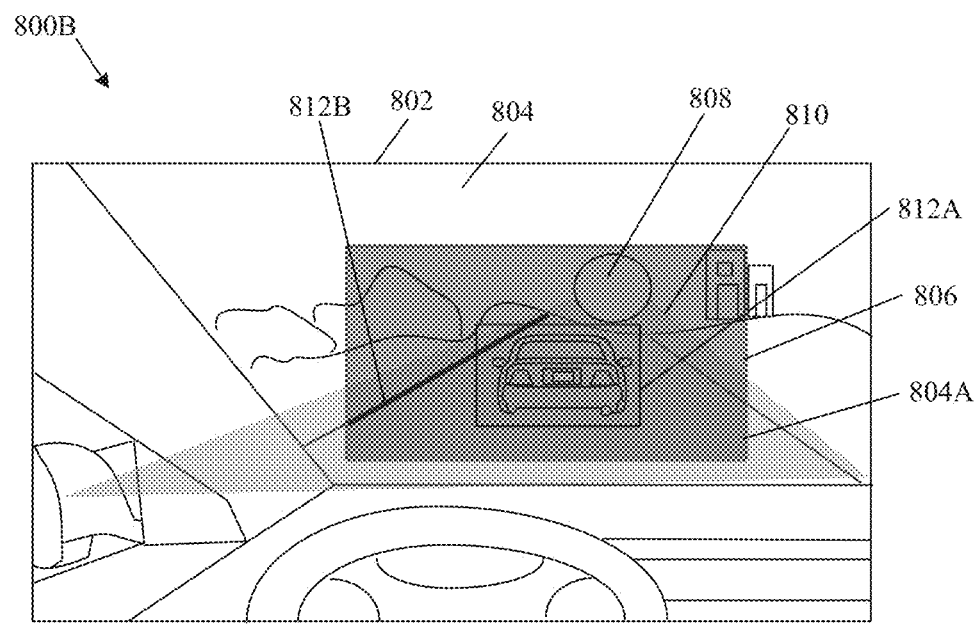

FIG. 8B is a diagram that illustrates an exemplary scenario for control of a first multilayer surface for an enclosed space that includes a heads-up display, in accordance with an embodiment of the disclosure. FIG. 8B is described in conjunction with elements from FIGS. 1, 2, 3, 4A, 4B, 4C, 5A, 5B, 6A, 6B, 7A, 7B, and 8A. With reference to FIG. 8B, there is shown a scenario 800B. In the scenario 800B, there is shown the vehicle 802 and a first portion 804A of the first multilayer surface 804. The circuitry 204 may select the first portion 804A of the first multilayer surface 804 based on the position of the external light source 808 with respect to the position of the occupant. The circuitry 204 may then control at least one of a color of the first portion 804A or the opacity level of the first portion 804A of the first multilayer surface 804. As shown in FIG. 8B, the heads-up display 806 may overlap with the first portion 804A of the first multilayer surface 804. In an embodiment, the circuitry 204 may control the color and the opacity level based on the determination that the amount of the incident light 810 on the heads-up display 806 exceeds the threshold.

The circuitry 204 may increase the opacity level of the first portion 804A of the first multilayer surface 804, such that the content of the heads-up display 806 is clearly visible to occupant. The circuitry 204 may increase the opacity level of the first portion 804A to such a level that the street is clearly visible to the occupant through the first portion 804A. Furthermore, the circuitry 204 may control the color of the first portion 804A of the first multilayer surface 804 to be darker (such as a shade of grey), such that the street is clearly visible to the occupant through the first portion 804A of the first multilayer surface 804. In certain scenarios, in case the opacity level of the first portion 804A has been increased causing visibility through the first portion 804A to decrease to certain extent, the circuitry 204 may cause the heads-up display 806 to project information onto the first portion 804A to aid the occupant (such as the driver) of the vehicle 802. For example, the circuitry 204 may cause the heads-up display 806 to project a bright rectangular rectangle 812A to highlight the vehicle in a field of view of the heads-up display 806, such that the occupant may become clearly aware of the vehicle in front. In another example, the circuitry 204 may cause the heads-up display 806 to project a bright line 812B to highlight the lane marking on the street in a field of view of the heads-up display 806, such that the occupant may become clearly aware of the lane marking. Thus, the circuitry 204 may control the opacity level of the first portion 804A to provide shade to the occupant (such as the driver or the passenger) from the glare caused by the incident light 810, and concurrently cause the heads-up display 806 to project critical information to aid the occupant in driving when the first portion 804A is shaded, to thereby improve the driving experience of the occupant.

Figure 9:
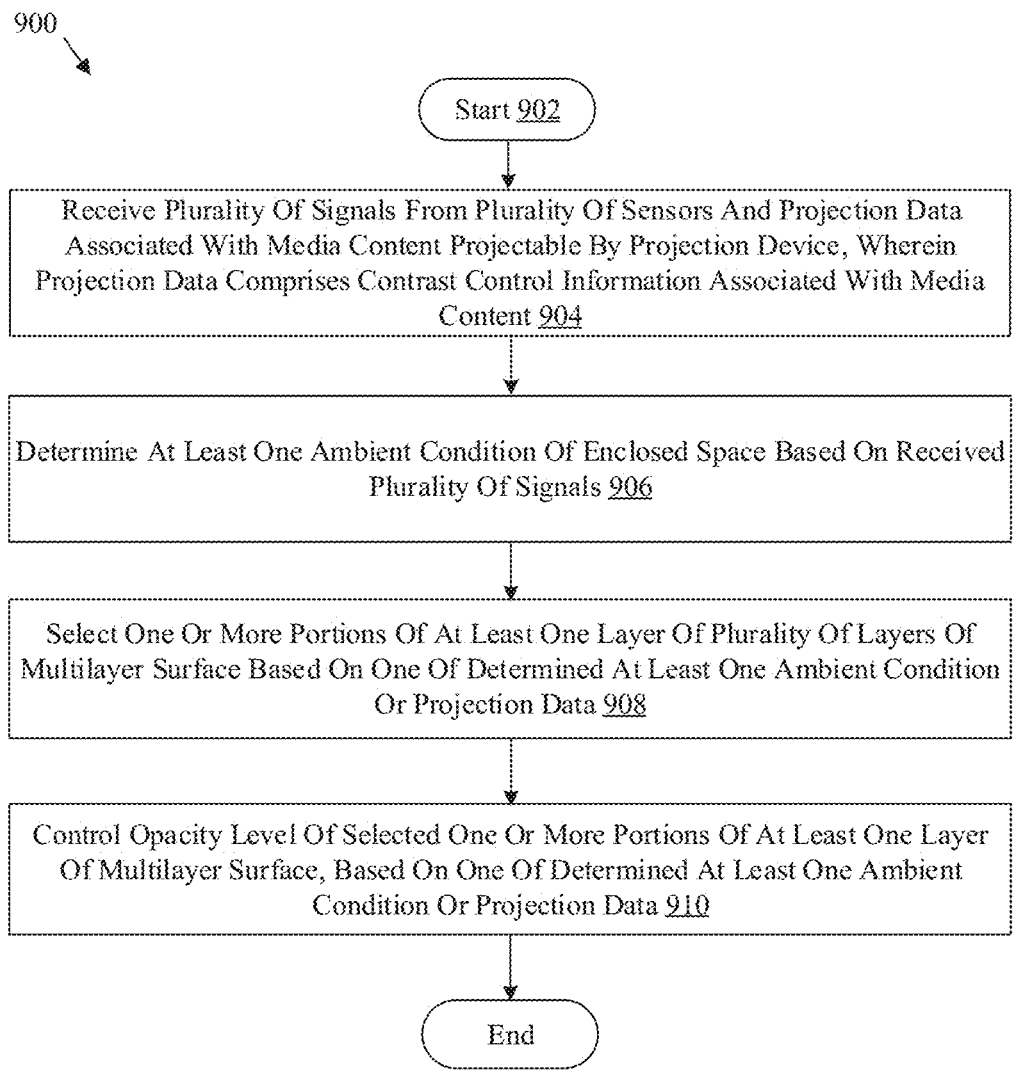
FIG. 9 is a flowchart that illustrates an exemplary method for control of a multilayer surface for an enclosed space, in accordance with an embodiment of the disclosure.

FIG. 9 is a flowchart that illustrates an exemplary method for control of a multilayer surface for an enclosed space, in accordance with an embodiment of the disclosure. FIG. 9 is explained in conjunction with elements from FIGS. 1, 2, 3, and 4A, 4B, 4C, 5A, 5B, 6A, 6B, 7A, 7B, 8A and 8B. With reference to FIG. 9, there is shown a flowchart 900. The method illustrated in the flowchart 900 may be executed by any computing system, such as by the system 102, the apparatus 202, the circuitry 204, or the control system 302. The method may start at 902 and proceed to 904.

At 904, the plurality of signals may be received from a plurality of sensors (such as the plurality of sensors 108) and projection data (such as the projection data 318A) associated with the media content (such as the media content 606) projectable by the projection device 110. In accordance with an embodiment, the circuitry 204 may be configured to receive the plurality of signals from the plurality of sensors 108 and the projection data 318A associated with the media content 606 projectable by the projection device 110. Details of the reception of the plurality of signals and the projection data are provided, for example, in FIG. 3.

At 906, at least one ambient condition of the enclosed space (such as the enclosed space 116) may be determined based on the received plurality of signals. In accordance with an embodiment, the circuitry 204 may be configured to determine at least one ambient condition of the enclosed space 116 of the vehicle 114. Details of the determination of the ambient condition are provided, for example, in FIGS. 4A-4C.

At 908, one or more portions 106 of at least one layer of the plurality of layers of a first multilayer surface (such as the first multilayer surface 104) may be selected. In accordance with an embodiment, the circuitry 204 may be configured to select one or more portions 106 of at least one layer of the plurality of layers of the first multilayer surface 104, based on one of the determined at least one ambient condition or the projection data. Details of the selection of the one or more portions 106 are provided, for example, in FIGS. 4A-4C.

At 910, the opacity level of the selected one or more portions 106 of at least one layer of the first multilayer surface 104 may be controlled. In accordance with an embodiment, the circuitry 204 may be configured to control the opacity level of the selected one or more portions 106 of at least one layer of the first multilayer surface 104, based on one of the determined at least one ambient condition or the projection data. Details of the control of the opacity level are provided, for example, in FIGS. 4A-4C.

Although the flowchart 900 is illustrated as discrete operations, such as 902, 904, 906, 908 and 910, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a system (such as the system 102 or the control system 302). The instructions may cause the machine and/or computer to perform operations that may include receiving a plurality of signals from a plurality of sensors (such as the plurality of sensors 108) and projection data (such as the projection data 318A) associated with a media content (such as the media content 606) projectable by a projection device (such as the projection device 110). The projection data 318A may include contrast control information associated with the media content 606. The operations may further include determining at least one ambient condition of an enclosed space (such as the enclosed space 116) based on the received plurality of signals. The operations may further include selecting one or more portions (such as the one or more portions 106) of at least one layer of the plurality of layers of a first multilayer surface (such as the first multilayer surface 104) based on one of the determined at least one ambient condition or the projection data 318A. The operations may further include controlling an opacity level of the selected one or more portions 106 of at least one layer of the first multilayer surface 104, based on one of the determined at least one ambient condition or the projection data 318A.

Exemplary aspects of the disclosure may provide a system (such as the system 102 of FIG. 1) that includes a first multilayer surface (such as the first multilayer surface 104), a plurality of sensors (such as the plurality of sensors 108) and circuitry (such as the circuitry 204). The circuitry 204 may be communicatively coupled to the first multilayer surface 104, the plurality of sensors 108 and a projection device (such as the projection device 110). The circuitry 204 may be configured to receive a plurality of signals from the plurality of sensors 108 and projection data (such as the projection data 318A) associated with a media content (such as the media content 606) projectable by the projection device 110. The projection data 318A may include contrast control information associated with the media content 606. The circuitry 204 may be further configured to determine at least one ambient condition of an enclosed space (such as the enclosed space 116) based on the received plurality of signals. The circuitry 204 may be further configured to select one or more portions (such as the one or more portions 106) of at least one layer of the plurality of layers of the first multilayer surface 104 based on one of the determined at least one ambient condition or the projection data 318A. The circuitry 204 may be further configured to control an opacity level of the selected one or more portions 106 of at least one layer of the first multilayer surface 104, based on one of the determined at least one ambient condition or the projection data.

In accordance with an embodiment, the circuitry 204 may be further configured to control the opacity level of each layer of the plurality of layers to change a color of the first multilayer surface 104.

In accordance with an embodiment, the ambient condition may correspond to an ambient light condition of the enclosed space 116. The first multilayer surface 104 (such as the first multilayer surface 504) may correspond to one of a partition glass between a front section and a rear section of the enclosed space 116, a front glass of the enclosed space 116, a rear glass of the enclosed space 116, a roof window of the enclosed space 116, or a side window of the enclosed space 116.

In accordance with an embodiment, the plurality of sensors 108 may be configured to track a position of an external light source (such as the external light source 406) with respect to a position of an occupant (such as the occupant 404) of the enclosed space 116. The circuitry 204 may be further configured to receive the plurality of signals from the plurality of sensors 108 based on the tracked position of the external light source with respect to the position of the occupant 404. The circuitry 204 may further determine, based on the plurality of signals, a position and an amount of glare caused by the external light source with respect to the occupant 404 as the ambient light condition. The circuitry 204 may further select the one or more portions (such as the first portion 414) of at least one layer of the first multilayer surface 410 based on the determined position and the determined amount of the glare. The circuitry 204 may further control the opacity level of the selected one or more portions (such as the first portion 414) of at least one layer of the first multilayer surface 410.

In accordance with an embodiment, the selected one or more portions (such as the first portion 414) of at least one layer may correspond to the determined position of the glare with respect to the occupant 404. The control of the opacity level may correspond to the determined amount of the glare.

In accordance with an embodiment, the circuitry 204 may be further configured to change the selection of the one or more portions (such as the first portion 414) of at least one layer of the first multilayer surface 410 based on a change in the tracked position of the external light source (such as the external light source 406). The circuitry 204 may change the opacity level of the selected one or more portions (such as the first portion 414) of at least one layer of the first multilayer surface 410 based on a change in the determined amount of the glare.

In accordance with an embodiment, the circuitry 204 may be further configured to control a second multilayer surface (such as the second multilayer surface 416) of the enclosed space 116 based on a change in the position of the glare caused by the external light source with respect to the position of the occupant 404.

In accordance with an embodiment, the ambient condition may correspond to an ambient brightness of the enclosed space 116. The plurality of sensors 108 may be configured to detect the ambient brightness of the enclosed space 116. The circuitry 204 may be further configured to receive information related to a weather condition at a geo-location of an occupant of the enclosed space 116. The information related to the weather condition may include at least an intensity of sunlight. The circuitry 204 may select the one or more portions of at least one layer of the first multilayer surface 504 based on the detected ambient brightness and the received information.

In accordance with an embodiment, the circuitry 204 may be configured to control the opacity level of the selected one or more portions of at least one layer of the first multilayer surface 504, based on the detected ambient brightness and the received information. The circuitry 204 may control an opacity level of a second multilayer surface 506 based on the detected ambient brightness and the received information.

In accordance with an embodiment, the first multilayer surface may correspond to a front glass of the enclosed space 116. The second multilayer surface 506 may correspond to one of a roof window of the enclosed space 116 or a side window of the enclosed space 116.

In accordance with an embodiment, the first multilayer surface 504 may correspond to one of a partition glass between a front section and a rear section of the enclosed space 116, a front glass of the enclosed space 116, a rear glass of the enclosed space 116, a roof window of the enclosed space 116, or a side window of the enclosed space 116. The circuitry 204 may be configured to receive a user input from an occupant (such as the first occupant 602) of the enclosed space 116. The user input may correspond to selection of the first multilayer surface 504 as a projection surface for projection of the media content. The circuitry 204 may further select the one or more portions of at least one layer of the first multilayer surface 504, based on the projection data 318A and a position of the first occupant 602 with respect to the first multilayer surface 504. The circuitry 204 may control at least one of a color of the first multilayer surface 504 or the opacity level of the selected one or more portions of at least one layer of the first multilayer surface 504, based on the projection data 318A.

In accordance with an embodiment, the circuitry 204 may be further configured to synchronize the selection of the one or more portions (such as the first portion 710A, the second portion 710B, the third portion 710C, the fourth portion 710D, and the fifth portion 710E) of at least one layer of the first multilayer surface 710 and the control of the opacity level of the selected one or more portions with a playback of the media content 702 projected on the projection surface. In accordance with an embodiment, the projection surface may correspond to at least one of the partition glass, the front glass of the enclosed space 116, the roof window of the enclosed space 116, or the side window of the enclosed space 116.

In accordance with an embodiment, the one or more portions (such as the first portion 804A) of the first multilayer surface 804 includes a heads-up display 806. The circuitry 204 may be configured to determine, based on the plurality of signals, an amount of incident light on the heads-up display 806 from an external light source (such as the external light source 808) exceeds a threshold. The circuitry 204 may further control at least one of a color of the first multilayer surface 804 or the opacity level of the one or more portions (such as the first portion 804A) of the first multilayer surface 804, based on the determination that the amount of the incident light on the heads-up display 806 exceeds the threshold.

In accordance with an embodiment, the plurality of layers of the first multilayer surface 104 may include at least one liquid crystal layer and at least one suspended particle devices layer. The circuitry 204 may be further configured to individually control the opacity level of each layer of the plurality of layers.

Exemplary aspects of the disclosure may provide an apparatus (such as the apparatus 202 of FIG. 2) that includes circuitry (such as the circuitry 204). The circuitry 204 may be communicatively coupled to a multilayer surface (such as the first multilayer surface 104) having a plurality of layers, a plurality of sensors (such as the plurality of sensors 108) and a projection device (such as the projection device 110). The circuitry 204 may be configured to receive a plurality of signals from the plurality of sensors 108 and (such as the projection data 318A) associated with a media content (such as the media content 606) projectable by the projection device 110. The projection data 318A may include contrast control information associated with the media content 606. The circuitry 204 may be further configured to determine at least one ambient condition of an enclosed space (such as the enclosed space 116) based on the received plurality of signals. The circuitry 204 may be further configured to select one or more portions (such as the one or more portions 106) of at least one layer of the plurality of layers of the first multilayer surface 104 based on one of the determined at least one ambient condition or the projection data 318A. The circuitry 204 may be further configured to control an opacity level of the selected one or more portions 106 of at least one layer of the first multilayer surface 104, based on one of the determined at least one ambient condition or the projection data 318A.

In accordance with an embodiment, the ambient condition may correspond to one of an ambient light condition or an ambient brightness of the enclosed space 116. The first multilayer surface 104 may correspond to one of a partition glass between a front section and a rear section of the enclosed space 116, a front glass of the enclosed space 116, a roof window of the enclosed space 116, or a side window of the enclosed space 116.

In accordance with an embodiment, the first multilayer surface 104 may correspond to one of a partition glass between a front section and a rear section of the enclosed space 116, a front glass of the enclosed space 116, a roof window of the enclosed space 116, or a side window of the enclosed space 116. The circuitry 204 may be configured to receive a user input from an occupant of the enclosed space 116. The user input may correspond to selection of the first multilayer surface 104 as a projection surface for projection of the media content 606. The circuitry 204 may select the one or more portions of at least one layer of the first multilayer surface 104, based on the projection data 318A and a position of the occupant with respect to the first multilayer surface 104. The circuitry 204 may control at least one of a color of the first multilayer surface 104 or the opacity level of the selected one or more portions of at least one layer of the first multilayer surface 104, based on the projection data 318A.

In accordance with an embodiment, the circuitry 204 may be further configured to synchronize the selection of the one or more portions of at least one layer of the first multilayer surface 104 and the control of the opacity level of the selected one or more portions with a playback of the media content 606 projected on the projection surface.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A system, comprising:
   a first multilayer surface that comprises a plurality of layers, wherein the first multilayer surface corresponds to one of a partition glass between a front section and a rear section of an enclosed space, a front glass of the enclosed space, a rear glass of the enclosed space, a roof window of the enclosed space, or a side window of the enclosed space;
   a plurality of sensors; and
   circuitry communicatively coupled to the first multilayer surface, the plurality of sensors, and a projection device, wherein the circuitry is configured to:
      receive a plurality of signals from the plurality of sensors and projection data associated with a media content projectable by the projection device, wherein the projection data comprises contrast control information associated with the media content;
      determine at least one ambient condition of the enclosed space based on the received plurality of signals;
      receive a user input from an occupant of the enclosed space, wherein the user input corresponds to selection of the first multilayer surface as a projection surface for projection of the media content;
      select one or more portions of at least one layer of the plurality of layers of the first multilayer surface based on a position of the occupant with respect to the first multilayer surface and the projection data; and
      control at least one of a color of the first multilayer surface or an opacity level of the selected one or more portions of the at least one layer of the first multilayer surface, based on one the projection data.

2. The system according to claim 1, wherein the circuitry is further configured to control the opacity level of each layer of the plurality of layers to change the color of the first multilayer surface.

3. The system according to claim 1, wherein the ambient condition corresponds to an ambient light condition of the enclosed space.

4. The system according to claim 3, wherein the plurality of sensors is configured to track a position of an external light source with respect to the position of the occupant of the enclosed space, and
the circuitry is further configured to:
   receive the plurality of signals from the plurality of sensors based on the tracked position of the external light source with respect to the position of the occupant;
   determine, based on the plurality of signals, a position and an amount of glare caused by the external light source with respect to the occupant as the ambient light condition;
   select the one or more portions of the at least one layer of the first multilayer surface based on the determined position and the determined amount of the glare; and
   control the opacity level of the selected one or more portions of the at least one layer of the first multilayer surface.

5. The system according to claim 4, wherein
the selected one or more portions of the at least one layer corresponds to the determined position of the glare with respect to the occupant, and
the control of the opacity level corresponds to the determined amount of the glare.

6. The system according to claim 5, wherein the circuitry is further configured to:
    change the selection of the one or more portions of the at least one layer of the first multilayer surface based on a change in the tracked position of the external light source; and
    change the opacity level of the selected one or more portions of the at least one layer of the first multilayer surface based on a change in the determined amount of the glare.

7. The system according to claim 5, wherein the circuitry is further configured to control a second multilayer surface of the enclosed space based on a change in the position of the glare caused by the external light source with respect to the position of the occupant.

8. The system according to claim 1, wherein
    the ambient condition corresponds to an ambient brightness of the enclosed space,
    the plurality of sensors is configured to detect the ambient brightness of the enclosed space, and
    the circuitry is further configured to:
        receive information related to a weather condition at a geo-location of the occupant of the enclosed space, wherein the information related to the weather condition comprises at least an intensity of sunlight; and
        select the one or more portions of the at least one layer of the first multilayer surface based on the detected ambient brightness and the received information.

9. The system according to claim 8, wherein the circuitry is further configured to:
    control the opacity level of the selected one or more portions of the at least one layer of the first multilayer surface, based on the detected ambient brightness and the received information; and
    control an opacity level of a second multilayer surface based on the detected ambient brightness and the received information.

10. The system according to claim 9, wherein
    the first multilayer surface corresponds to the front glass of the enclosed space, and
    the second multilayer surface corresponds to one of the roof window of the enclosed space or the side window of the enclosed space.

11. The system according to claim 1, wherein the circuitry is further configured to synchronize the selection of the one or more portions of the at least one layer of the first multilayer surface and the control of the opacity level of the selected one or more portions with a playback of the media content projected on the projection surface.

12. The system according to claim 1, wherein the projection surface corresponds to at least one of the partition glass, the front glass of the enclosed space, the roof window of the enclosed space, or the side window of the enclosed space.

13. The system according to claim 1, wherein
    the one or more portions of the first multilayer surface includes a heads-up display, and
    the circuitry is further configured to:
        determine, based on the plurality of signals, an amount of incident light on the heads-up display from an external light source exceeds a threshold; and
        control at least one of the color of the first multilayer surface or the opacity level of the one or more portions of the first multilayer surface, based on the determination that the amount of the incident light on the heads-up display exceeds the threshold.

14. The system according to claim 1, wherein
    the plurality of layers of the first multilayer surface comprises at least one liquid crystal layer and at least one suspended particle devices layer, and
    the circuitry is further configured to individually control the opacity level of each layer of the plurality of layers.

15. An apparatus, comprising:
    circuitry communicatively coupled to a multilayer surface comprising a plurality of layers, a plurality of sensors, and a projection device, wherein
        the multilayer surface corresponds to one of a partition glass between a front section and a rear section of an enclosed space, a front glass of the enclosed space, a rear glass of the enclosed space, a roof window of the enclosed space, or a side window of the enclosed space, and
        the circuitry is configured to:
            receive a plurality of signals from the plurality of sensors and projection data associated with a media content projectable by the projection device, wherein the projection data comprises contrast control information associated with the media content;
            determine at least one ambient condition of the enclosed space based on the received plurality of signals;
            receive a user input from an occupant of the enclosed space, wherein the user input corresponds to selection of the multilayer surface as a projection surface for projection of the media content;
            select one or more portions of at least one layer of the plurality of layers of the multilayer surface based on a position of the occupant with respect to the multilayer surface and the projection data; and
            control at least one of a color of the multilayer surface or an opacity level of the selected one or more portions of the at least one layer of the multilayer surface, based on the projection data.

16. The apparatus according to claim 15, wherein the ambient condition corresponds to one of an ambient light condition or an ambient brightness of the enclosed space.

17. The apparatus according to claim 15, wherein the circuitry is further configured to synchronize the selection of the one or more portions of the at least one layer of the multilayer surface and the control of the opacity level of the selected one or more portions with a playback of the media content projected on the projection surface.

18. A method, comprising:
    in a system comprising a multilayer surface that comprises a plurality of layers, a plurality of sensors, and circuitry communicatively coupled to the multilayer surface, the plurality of sensors, and a projection device, wherein the multilayer surface corresponds to one of a partition glass between a front section and a rear section of an enclosed space, a front glass of the enclosed space, a rear glass of the enclosed space, a roof window of the enclosed space, or a side window of the enclosed space:
        receiving a plurality of signals from the plurality of sensors and projection data associated with a media content projectable by the projection device, wherein the projection data comprises contrast control information associated with the media content;
        determining at least one ambient condition of the enclosed space based on the received plurality of signals;

receiving a user input from an occupant of the enclosed space, wherein the user input corresponds to selection of the multilayer surface as a projection surface for projection of the media content;

selecting one or more portions of at least one layer of the plurality of layers of the multilayer surface based on a position of the occupant with respect to the multilayer surface and the projection data; and controlling at least one of a color of the multilayer surface or an opacity level of the selected one or more portions of the at least one layer of the multilayer surface, based on the projection data.

\* \* \* \* \*